United States Patent [19]
Liu et al.

[11] Patent Number: 6,122,260
[45] Date of Patent: Sep. 19, 2000

[54] SMART ANTENNA CDMA WIRELESS COMMUNICATION SYSTEM

[75] Inventors: Hui Liu; Guanghan Xu, both of Austin, Tex.

[73] Assignee: Civil Telecommunications, Inc.

[21] Appl. No.: 08/768,100

[22] Filed: Dec. 16, 1996

[51] Int. Cl.[7] .................................................. H04J 13/00
[52] U.S. Cl. ............................................................ 370/280
[58] Field of Search .................................... 370/310, 316, 370/318, 320, 321, 329, 344, 333, 335, 336, 337, 339, 340, 342, 343, 347, 350, 441, 442, 479, 480, 276, 277, 278, 280, 341, 338, 377, 332–334, 326, 317, 311, 503; 375/200, 206, 324, 326, 347, 130, 277, 312, 356; 455/562, 38.1, 38.3, 504, 505, 506, 502, 501, 101, 132, 134, 155

[56] References Cited

U.S. PATENT DOCUMENTS

| | | |
|---|---|---|
| 4,901,307 | 2/1990 | Gilhousen et al. . |
| 5,103,459 | 4/1992 | Gilhousen et al. . |
| 5,515,378 | 5/1996 | Roy, III et al. .......................... 342/386 |
| 5,592,490 | 1/1997 | Barratt et al. . |
| 5,864,548 | 1/1999 | Liu .......................................... 375/200 |
| 5,909,470 | 6/1999 | Barratt et al. ............................ 375/324 |

FOREIGN PATENT DOCUMENTS

| | | |
|---|---|---|
| 0 668 668 A1 | 8/1995 | European Pat. Off. . |
| 000551644 | 7/1995 | Japan . |

OTHER PUBLICATIONS

Lang et al., "Stochastic Effects in Adaptive Null–Steering Antenna Array Performance," IEEE Journal, vol. SAC–3, No. 5, Sep. 1985, pp. 767–778.

Winters et al., "The Impact of Antenna Diversity on the Capacity of Wireless Communication Systems," IEEE Journal, vol. 42, No. 2/3/4, Feb./Mar./Apr. 1994, pp. 1740–1751.

Lee, W., "Overview of Cellular CDMA," IEEE Journal, vol. 40, No. 2, May 1991, pp. 291–301.

International Search Report for PCT/US 97/22878 dated Dec. 12, 1997.

*Primary Examiner*—Dang Ton
*Attorney, Agent, or Firm*—Jeffrey C. Hood; Conley, Rose & Tayon; Michael J. Deluca

[57] ABSTRACT

A TDD antenna array S-CDMA system for increasing the capacity and quality of a wireless communications is disclosed. By simultaneous exploiting the spatial and code diversities, high performance communications between a plurality of remote terminals and a base station is achieved without sacrificing system flexibility and robustness. The time-division-duplex mode together with the inherent interference immunity of S-CDMA signals allow the spatial diversity to be exploited using simple and robust beamforming rather than demanding nulling. Measurements from an array of receiving antennas at the base station are utilized to estimate spatial signatures, timing offsets, transmission powers and other propagation parameters associated with a plurality of S-CDMA terminals. Such information is then used for system synchronization, downlink beamforming, as well as handoff management. In an examplary embodiment, the aforementioned processing is accomplished with minimum computations, thereby allowing the disclosed system to be applicable to a rapidly varying environment. Among many other inherent benefits of the present invention are large capacity and power efficiency, strong interference/fading resistance, robustness power control, and easy handoff.

75 Claims, 12 Drawing Sheets

SMART ANTENNA CDMA WIRELESS COMMUNICATION SYSTEM

BACKGROUND OF THE INVENTION

This invention relates in general to the field of wireless communication systems, and more particularly to spread spectrum CDMA communications with antenna arrays.

The communication infrastructure of future wireless services will involve high-speed networks, central base stations, and various nomadic mobile units of different complexity that must interoperate seamlessly. In addition to standard issues such as capability and affordability, a mobile wireless network also emphasizes survivability against fading and interference, system flexibility and robustness, and fast access. Innovative communication technologies are strategically important to the realization of high performance Personal Communications Services (PCS) systems (D. Goodman, "Trends in Cellular and Cordless Communications", IEEE Communications Magazine, June 1991).

In PCS and other wireless communication systems, a central base station communicates with a plurality of remote terminals. Frequency-division multiple access (FDMA) and Time-division multiple access (TDMA) are the traditional multiple access schemes to provide simultaneous services to a number of terminals. The basic idea behind FDMA and TDMA techniques is to slice the available resource into multiple frequency or time slots, respectively, so that multiple terminals can be accommodated without causing interference.

Contrasting these schemes which separate signals in frequency or time domains, Code-division multiple access (CDMA) allows multiple users to share a common frequency and time channel by using coded modulation. In addition to bandwidth efficiency and interference immunity, CDMA has shown real promise in wireless applications for its adaptability to dynamic traffic patterns in a mobile environment. Because of these intrinsic advantages, CDMA is seen as the generic next-generation signal access strategy for wireless communications. However, current commercial CDMA technologies, e.g., the IS-95 standard developed by Qualcomm, still have substantial practical problems, the most important being a stringent requirement for accurate and rapid control of a terminals' transmission power. Although the power control problem may be alleviated by the use of synchronous CDMA (S-CDMA) techniques, this introduces other problems in, e.g., synchronization. For more information, please refer to M. K. Simon et al., "Spread Spectrum Communications Handbook", McGraw-Hill, 1994; Bustamante et al., "Wireless Direct Sequence Spread Spectrum Digital Cellular Telephone System, U.S. Pat. No. 5,375,140, December 1994; Schilling, "Synchronous Spread-Specturm Communications System and Method", U.S. Pat. No. 5,420,896, May 1995.

It is well known that given a fixed amount of frequency allocation, there exists an upper limit on the number of channels available for reliable communications at a certain data rate. Therefore, the aforementioned schemes can only increase the system capacity and performance to a certain extent. To exceed this limit, additional resources need to be allocated. The most recent attempts to increase system capacity and performance have attempted to exploit spatial diversities. The new dimension, i.e., space, when properly exploited by the employment of multiple antennas, can in principle lead to a significant increase in the system capacity (S. Andersson et al., "An Adaptive Array for Mobile Communication Systems," IEEE Trans. on Veh. Tec., Vol. 4, No. 1, pp 230–236, 1991; J. Winters et al., "The Impact of Antenna Diversity on the Capacity of Wireless Communication Systems, IEEE Trans. on Communications, Vol. 42, No. 2/3/4, pp 1740–1751, 1994.) Other potential benefits include lower power consumption, higher immunity against fading and interference, more efficient handoff, and better privacy. A wireless communications system that utilizes adaptive antenna arrays is hereafter referred to as a Smart Antenna System. Despite of its promises however, many practical problems exist in smart antenna applications. For many reasons and mostly due to limitations of the existing wireless protocols, it is generally difficult to integrate the state-of-the-art antenna array technologies into current systems.

Sectorization, i.e., partitioning a coverage area into sectors by the use of directive antennas, is one of the straightforward means of exploiting the spatial diversity for capacity and performance advances. There have been a significant number of studies and patents in this area including S. Hattori, et al., "Mobile Communication System," U.S. Pat. No. 4,955,082, January 1989; T. Shimizu, et al., "High Throughput Communication Method and System for a Digital Mobile Station When Crossing a Zone Boundary During a Session," U.S. Pat. No. 4,989,204, December 1989; V. Graziano, "Antenna Array for a Cellular RF Communications System," U.S. Pat. No. 4,128,740, 13/1977. The sectorization approaches, however simple, have fundamental difficulties in handling the everchanging traffic pattern. As a result, sectorization offers only a limited capacity increase at the expense of more handoffs and complicated administration.

To accommodate the time-varying nature of mobile communications, adaptive antenna array technologies have been investigated; see e.g., K. Yamamoto, "Space Diversity Communications System for Multi-Direction Time Division Multiplex Communications", U.S. Pat. No. 4,599,734, April. 1985; D. F. Bantz, "Diversity Transmission Strategy in Mobile/Indoor Cellular Radio Communications", U.S. Pat. No. 5,507,035, April 1993; C. Wheatley, "Antenna System for Multipath Diversity in an Indoor Microcellular Communication System", U.S. Pat. No. 5,437,055, July 1995; The most aggressive schemes, often referred to as Spatial-Division Multiple Access (SDMA), allow multiple terminals to share one conventional channel (frequency, time) through different spatial channels, thereby multiplying the system capacity without additional frequency allocation (S. Andersson et al., "An Adaptive Array for Mobile Communication Systems," IEEE Trans. on Veh. Tec., Vol. 4, No. 1, pp 230–236, 1991; R. Roy et al., "Spatial Division Multiple Access Wireless Communication Systems", U.S. Pat. No. 5,515,378, April 1996, U.S. Cl.).

The key operations in SDMA involve spatial parameter estimation, spatial multiplexing for downlink (from the base station to remote terminals) and demultiplexing for uplink (from remote terminals to the base station). Since most of the current wireless systems adopt Frequency-Division-Duplex (FDD) schemes, i.e., different carriers for uplink and downlink (e.g., AMPS, IS-54, GSM, etc.), basic physical principles determine that the uplink and downlink spatial characteristics may differ substantially. Consequently, spatial operations in most SDMA schemes rely on direction-of-arrival (DOA) information of the terminals. More specifically, spatial multiplexing/demultiplexing is performed by separating co-channel signals at different directions.

While theoretically sound, there are critical practical problems with the current SDMA technologies, the most important ones being (i) computationally demanding algorithms for DOA and other spatial parameter estimation; (ii) a stringent requirement for calibrated system hardware;(iii) performance susceptible to motions and hardware/software imperfections. The first problem may be alleviated in a time-division-duplex (TDD) system (e.g., CT-2 and DECT) where uplink and downlink have the same propagation patterns. In this case, a terminal's spatial signature, i.e., the antenna array response to signals transmitted from the terminal, can be utilized in SDMA—no individual multipath parameters is required. Nevertheless other key problems remain. These problems may vitiate the usefulness of SDMA in wireless, and especially mobile communication networks.

It is worth pointing out that the above problems are not inherent to antenna arrays, rather, they are due to the rigid exploitation of the spatial diversity in order to accommodate the existing wireless protocols. The spatial diversity, which are highly unstable in nature, cannot provide reliable channels for communications. Any attempt to add smart antennas to existing systems can only leads to sub-optimum results. From a system viewpoint, there is an evident need for a specially designed scheme which utilizes start-of-the-art wireless technologies including the smart antennas in a unified fashion. The present invention meets this requirement and provides solutions for all the aforementioned difficulties.

SUMMARY OF THE INVENTION

The present invention comprises a wireless communications system which integrates antenna arrays with synchronous CDMA techniques and time division duplexing (TDD). The resulting scheme is hereafter referred to as Smart Antenna CDMA (SA-CDMA). The present invention provides numerous advantages over prior art systems and methods, including improved system capacity and performance The four design issues for wireless systems are flexibility, quality, capacity and complexity . SA-CDMA is a novel scheme that addresses all these issues. The SA-CDMA system of the present invention possesses most of the desirable features of prior antenna array systems, without introducing hardware and computationally demanding operations which fundamentally limit the applicability of prior techniques in a dynamic mobile environment.

Briefly, in accordance with the present invention, an SA-CDMA system comprises a multichannel transceiver array with a plurality of antennas and a plurality of transceivers. The multichannel transceiver array is adapted for receiving combinations of multichannel uplink S-CDMA signals from the terminals and transmitting multichannel downlink S-CDMA signals towards the terminals. The multichannel transceiver array operates in a time division duplex manner, i.e., is adapted for receiving (RX) combinations of multichannel uplink S-CDMA signals from the terminals during a first time frame and is adapted for transmitting (TX) multichannel downlink S-CDMA signals towards the terminals during a second time frame.

The system further includes one or more digital processors (DSPs) or processing units and associated memory for performing the various uplink and downlink communication functions. The one or more processors are coupled to the multichannel transceiver array. The one or more processors execute code and data from the memory to implement the communication functions, such as a spatial processor, a despreader, a modulator, and a demodulator, among others.

The spatial processor is coupled to the multichannel transceiver array and determines spatial signature estimates associated with the terminals from the combinations of multichannel uplink S-CDMA signals. The spatial processor also calculates uplink and downlink beamforming matrices based on the spatial signature estimates.

The demodulator is coupled to the spatial processor and the multichannel transceiver array and determines estimates of uplink messages from the terminals from the combinations of multichannel uplink S-CDMA signals. The modulator generates the multichannel downlink S-CDMA signals to transmit messages destined for the terminals.

Each of the terminals includes a unique PN code sequence according to a CDMA access scheme. To obtain a spatial signature estimate for each terminal, the system utilizes a despreader to despread the combination of multichannel uplink S-CDMa signals. The depreader uses a respective terminals PN code sequence to depread the combination of multichannel uplink S-CDMA signals to obtain a multichannel symbol sequence. The spatial processor identifies a symbol sequence from the multichannel symbol sequence with the maximum signal power and further operates to normalize the multichannel symbol sequence with respect to the identified symbol sequence with the maximum signal power to obtain a normalized multichannel symbol sequence. The average of the normalized multichannel symbol sequence is then calculated as the spatial signature estimate.

In another embodiment, instead of identifying the sequence with the maximum energy and normalizing, the spatial processor forms a data convariance matrix of the multichannel symbol sequence and estimates the principal eigenvector of the resulting data convariance matrix as the spatial signature estimate.

In addition to providing essential parameters for power control and synchronization, the spatial processor can also provide DOA estimates when required. The DOA information, together with the heretofore unavailable delay estimates which reflect distance between the terminals and the base station, are utilized in soft handoff and localization.

The above operations allow code and space diversities to be exploited simultaneously without introducing undue complexity. The result is a significant advance in capacity and quality of communications, especially in a rapidly varying mobile system.

Therefore, the present invention has a number of basic properties and benefits which are summarized below:

1. The SA-CDMA system of the present invention is an efficient and reliable means for utilizing both spatial and code diversities in wireless communications. The new scheme accounts for the dynamic nature of the spatial channels and achieves optimum performance enhancement with minimum complexity.

2. TDD operations allow downlink beamforming to be performed straightforwardly based on spatial signatures rather than individual multipath parameters, thus eliminating the need for demanding DOA estimation and association.

3. The interference resistance of S-CDMA signals and the spatial selectivity of smart antennas complement each other, thus providing superior resistance against hardware and algorithm imperfections and relaxing the stringent requirements in power control.

4. In additional to DOA information, distance information of each subscriber is also available at the base station, hence permitting realization of "Baton" handoff and localization.

BRIEF DESCRIPTION OF THE DRAWINGS

The features and advantages of the present invention will become more apparent from the detailed description set forth below when taken in conjection with the drawings in which reference characters correspond throughout and wherein.

DETAILED DESCRIPTION OF THE PREFERRED EMBODIMENT

Incorporation by Reference

The following U.S. PATENT DOCUMENTS and references are hereby incorporated by reference as though fully and completely set forth herein.

U.S. Pat. No. 4,112,257 September 1978 Forms .
U.S. Pat. No. 4,128,740 March 1987 Graziano B
U.S. Pat. No. 4,291,410 September 1981 Caples et al.
U.S. Pat. No. 4,599,734 July 1986, Yamamoto
U.S. Pat. No. 4,639,914 January 1987 Winters
U.S. Pat. No. 4,969,732 July 1987 Roy et al.
U.S. Pat. No. 4,947,452 October 1989 Hattori et al.
U.S. Pat. No. 5,109,390 April 1992 Gilhousen et al.
U.S. Pat. No. 5,260,967 November 1993 Schilling
U.S. Pat. No. 5,375,140 December 1994 Bustamante et al.
U.S. Pat. No. 5,394,435 February 1995, Weerackody et al.
U.S. Pat. No. 5,420,896 May 1995, Schilling
U.S. Pat. No. 5,437,055 July 1995 Wheatley
U.S. Pat. No. 5,491,723 February 1996, Diepstraten et al
U.S. Pat. No. 5,507,035 April 1996, Bantz et al.

OTHER PUBLICATIONS

P. Balaban and J. Salz, "Dual Diversity Combining and Equalization in Digital Cellular Mobile Radio", IEEE Trans. on Vch. Tech., Vo. 40, No. 2, May 1991

Figure 1:
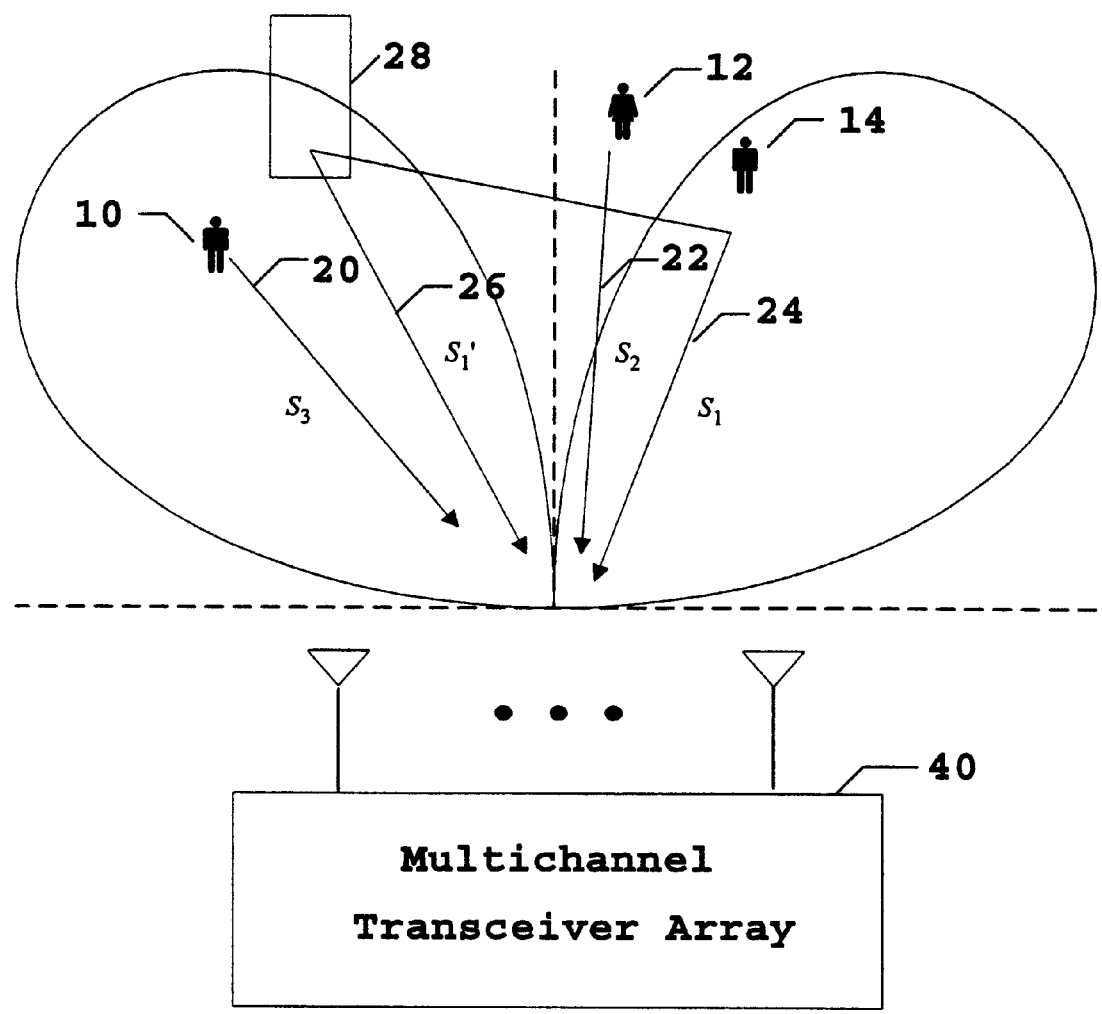
FIG. 1 is a graphic illustration of the prior sectorization antenna array system and its limitations.

FIG. 1 shows a wireless system according to the prior art with sectorized antennas and illustrates its disadvantages.

The prior art system includes a plurality of terminals 10, 12 and 14, i.e., a plurality of subscribers who possess terminals for wireless communication. The system also includes a base station comprising a multichannel transceiver array 40 and baseband processors (not shown). By exploiting the fact that signals $s_1, s_1', s_2$ and $s_3$ from different terminals arrive at the base station from different paths 20, 22, 24 and 26 within certain sectors, the multichannel transceiver array (40) is configured to partition a coverage area into multiple sectors. The directional transmission and reception within each sector results in lower power consumption, higher interference suppression, and higher capacity. In principle, the performance enhancement is proportional to the number of sectors that formed. However, this is not always true in practice since multipath reflections stemmed from one terminal (e.g., $s_1$ from path 24 and $s_1'$ from path 20 reflected from structure 28) may not be in the same sector, and physical principles prohibit the design of exceedingly small sectors. Furthermore, a terminal (12) that is located near the boundary of two sectors may suffer from sever degradation in performance. For the same reason the hand-off problem will also exacerbated if the application involves mobile terminals.

Figure 2:
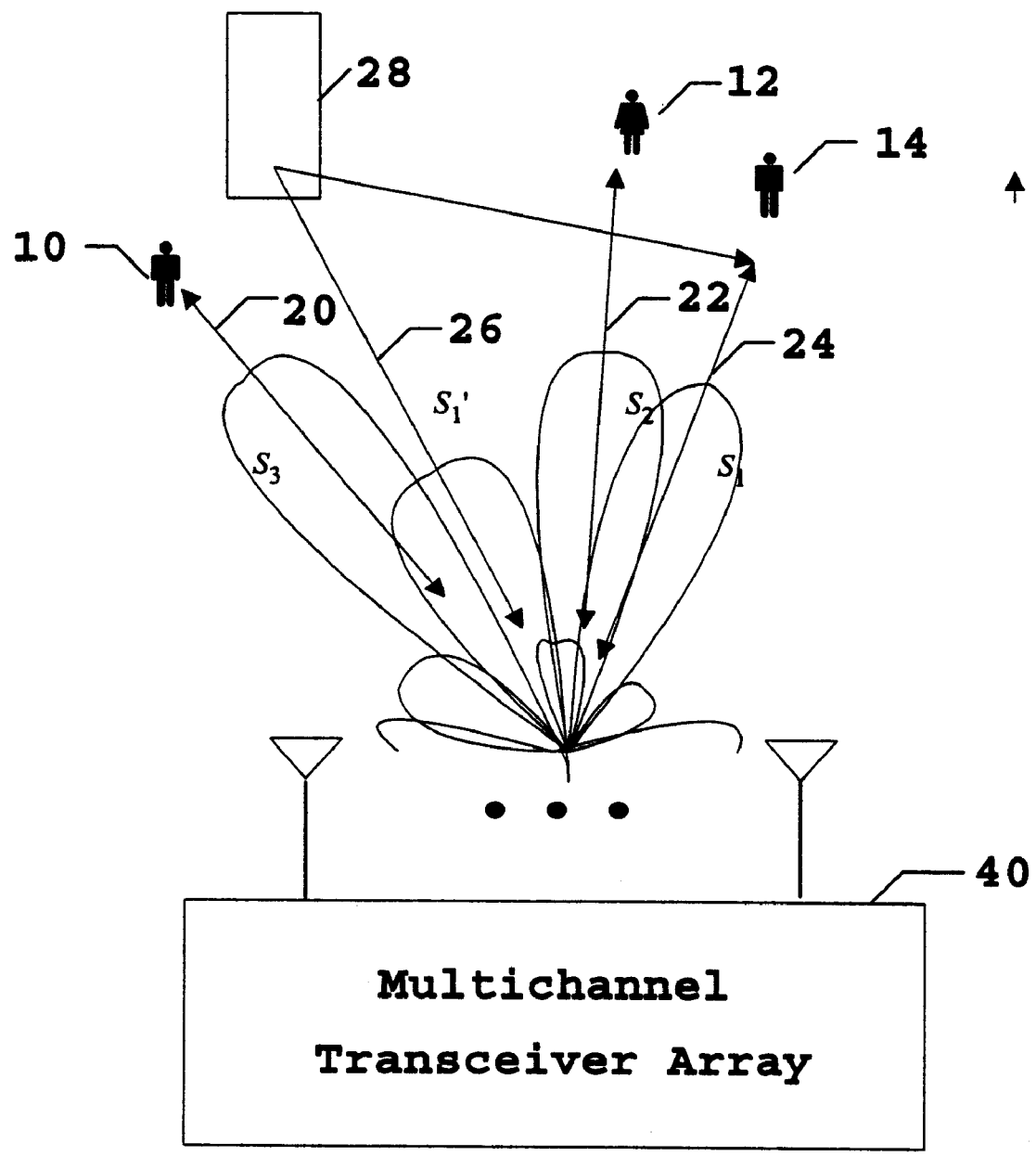
FIG. 2 is a graphic illustration of the prior SDMA wireless system and its limitations.

For the same scenario, FIG. 2 illustrates the basic principles of an SDMA system where co-channel signals are communicated between the remote terminals (10,12,14) and the base station multichannel transceiver array (40) at different directions. The intent of the figure is to show that when two terminals (12,14) are closely located, it becomes practically infeasible to estimate all the DOAs and maintain spatial separation of co-channel signals (22,24) above a predetermined level. In addition, even if all the DOAs can be resolved, association of multipath reflections from a same source is non-trivial.

Figure 3:
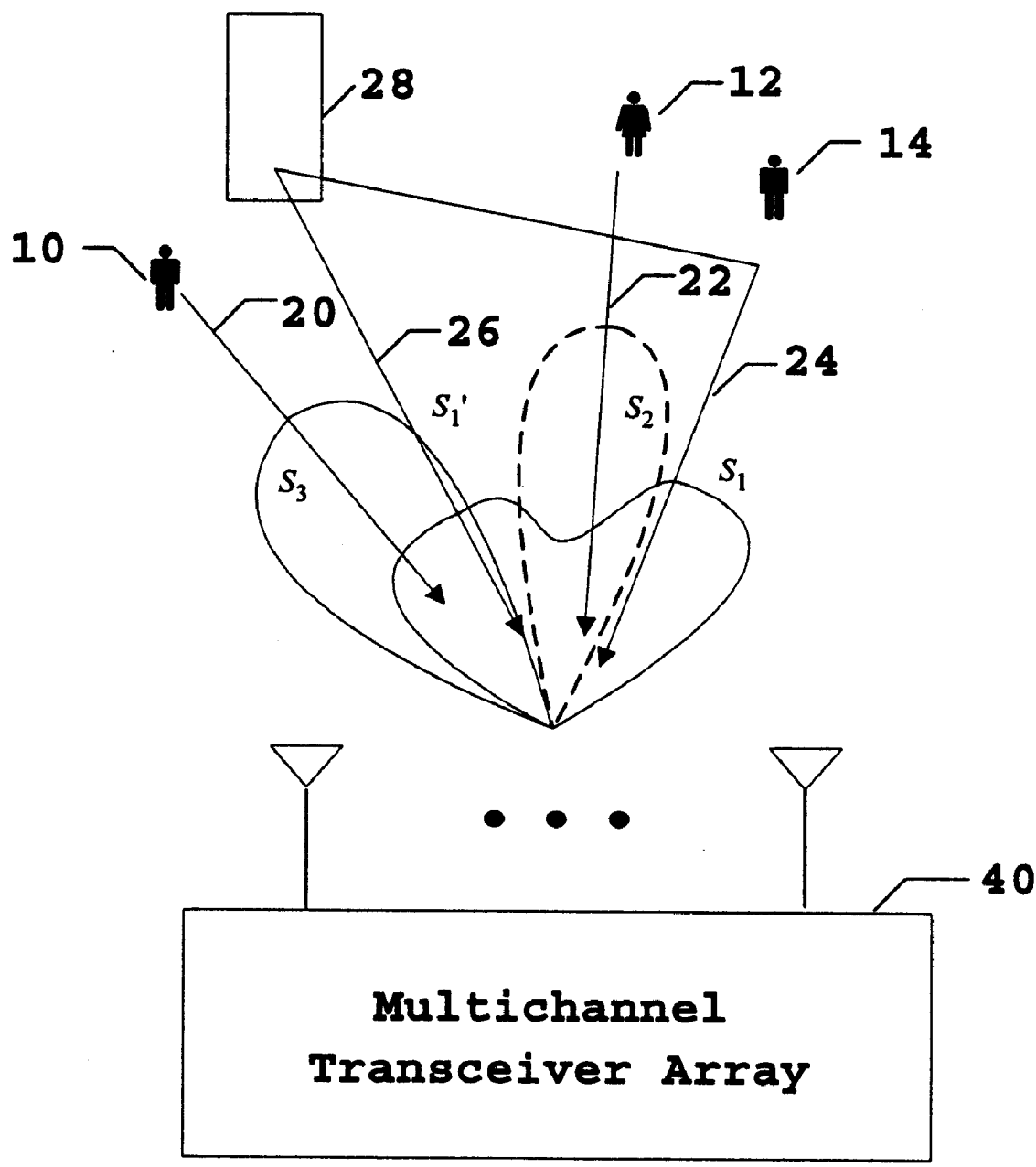
FIG. 3 illustrates how the disclosed SA-CDMA successfully overcomes the difficulties of the prior art.

FIG. 3 illustrates the how the system and method of the present invention overcomes the aforementioned problems. As discussed further below, the present ivention comprises a Time Division Duplex (TDD) antenna array Synchronous Code Division Multiple Access (S-CDMA) communications system for communicating message data to/from a plurality of terminals. In accordance with the disclosed SA-CDMA scheme, orthogonal codes are assigned to the remote terminals (10,12,14) so that each signal possesses inherent resistance against interference. Similar to the SDMA, spatial beamforming is utilized in the communications between the multichannel transceiver array (40) and the terminals (10, 12,14). One key difference however, is that, due to the CDMA access scheme being used, co-channel signals do not have to be fully separable in space. For the purpose of illustration, different line types are use to represent overlapped beam patterns with distinctive code words. Contrasting to the prior SDMA scheme, co-channel signals at one terminal are allowed in SA-CDMA because of the interference immunity provided by CDMA. Consequently, the requirements of spatial operations are significantly relaxed. By appropriate design of beamforms to suppress rather than to eliminate interference, substantial advances in performance can be achieved with robust and low complexity operations. The capability to suppress interference and provide for reliable performance enhancement using antenna arrays is unique to the SA-CDMA invention.

Figure 4:
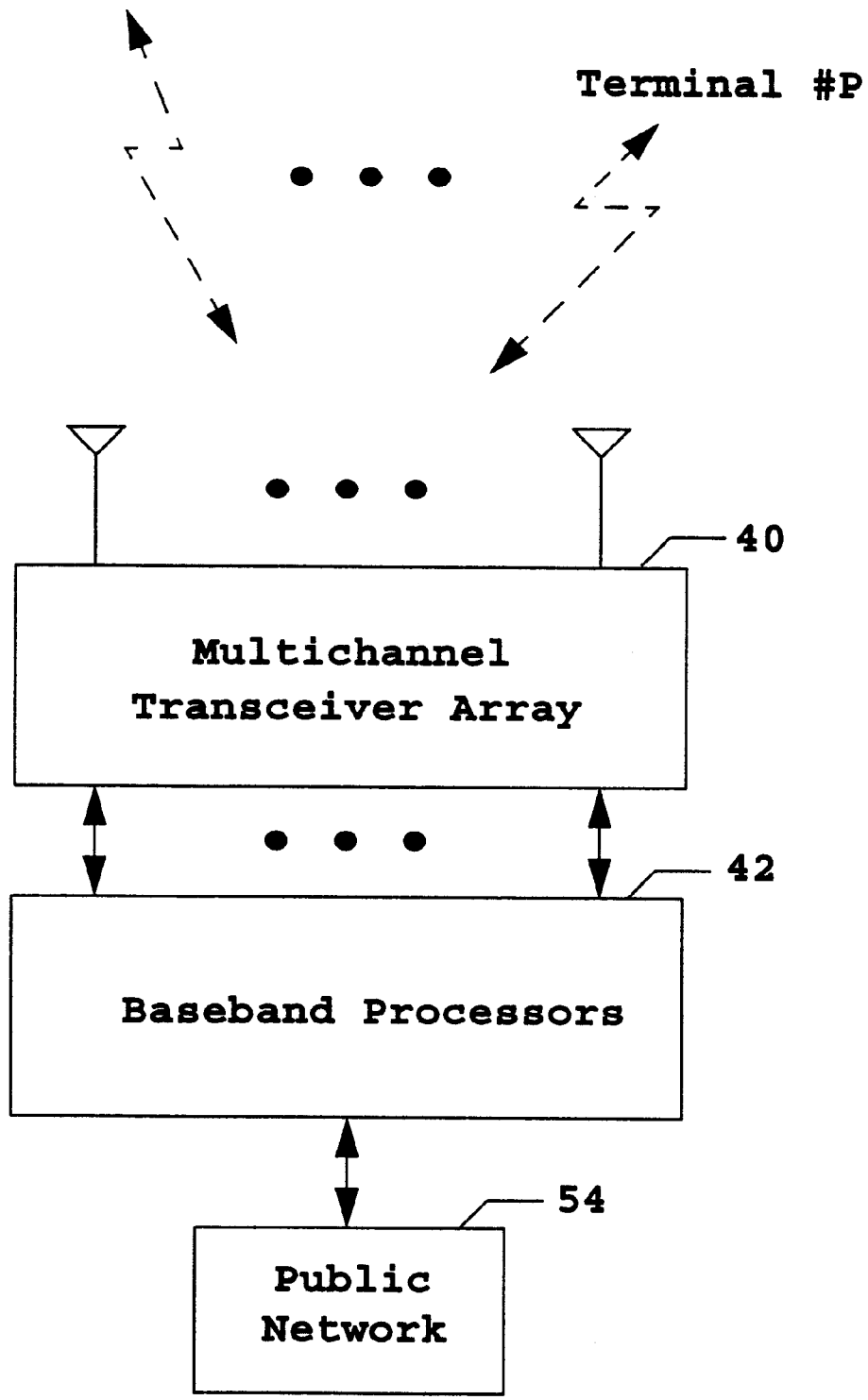
FIG. 4 illustrates the main function modules of the disclosed SA-CDMA system for communicate message data to/from a plurality of terminals.

FIG. 4 is a block diagram illustrating the main function modules of the disclosed SA-CDMA system according to the preferred embodiment of the invention. As mentioned above, the present invention comprises a Time Division Duplex (TDD) antenna array Synchronous Code Division Multiple Access (S-CDMA) communications system for communicating message data to/from a plurality of terminals. As shown in FIG. 4, the system, also referred to as a base station, comprises a multichannel transceiver array 40 coupled to one or more baseband processors 42. The multichannel transceiver array 40 is adapted to perform wireless communication with a plurality of terminals 1-P. The terminals 1-P comprise remote communication units which are used by subscribers for wireless communication. Thus a plurality of subscribers who each possess a terminal can communicate in a wireless fashion. Each of the terminals is configured with a unique pseudo noise (PN) signal or PN code sequence for CDMA communications. The base station or system shown in FIG. 4 also includes the PN code sequences for each of the terminals capable of communicating with the base station.

The baseband processors 42 further couple to the public network 54, wherein the public network includes other base stations for communication with other terminals. The public network also includes the public switched telephone network (PSTN) as well as other wired or wireless networks. Thus the connection to the public network 54 enables the terminals 1-P shown in FIG. 4 to communicate with terminals in wireless communication with another base station, or with individuals or subscribers connected to a wired network, such as the PSTN.

The multichannel transceiver array 40 comprises a plurality of antennas and a plurality of transceivers. The multichannel transceiver array 40 is adapted for receiving combinations of multichannel uplink S-CDMA signals from the terminals and transmitting multichannel downlink S-CDMA signals towards the terminals. The multichannel transceiver array 40 is adapted for receiving and transmitting in a time division duplex manner. In other words, the multichannel transceiver array 40 is adapted for receiving the combinations of multichannel uplink S-CDMA signals from the terminals during a first time frame and is adapted for transmitting the multichannel downlink S-CDMA signals towards the terminals during a second time frame.

Therefore, as shown, the SA-CDMA system is for communicating message data to/from a plurality of terminals (Terminal #1-#P). The multichannel transceiver array 40 realizes radio frequency (RF) to baseband conversion by means of a plurality of coherent transceivers as in the current art. Baseband processors 42 are coupled to the multichannel transceiver array 40 and perform all baseband operations, such as spatial parameter estimation, uplink and downlink beamforming and CDMA modulation and demodulation, etc. The baseband processors 42 are discussed in greater detail below. The demodulated messages are routed to a public network (54), which also provides messages destined for the terminals, as is currently done.

Figure 5:
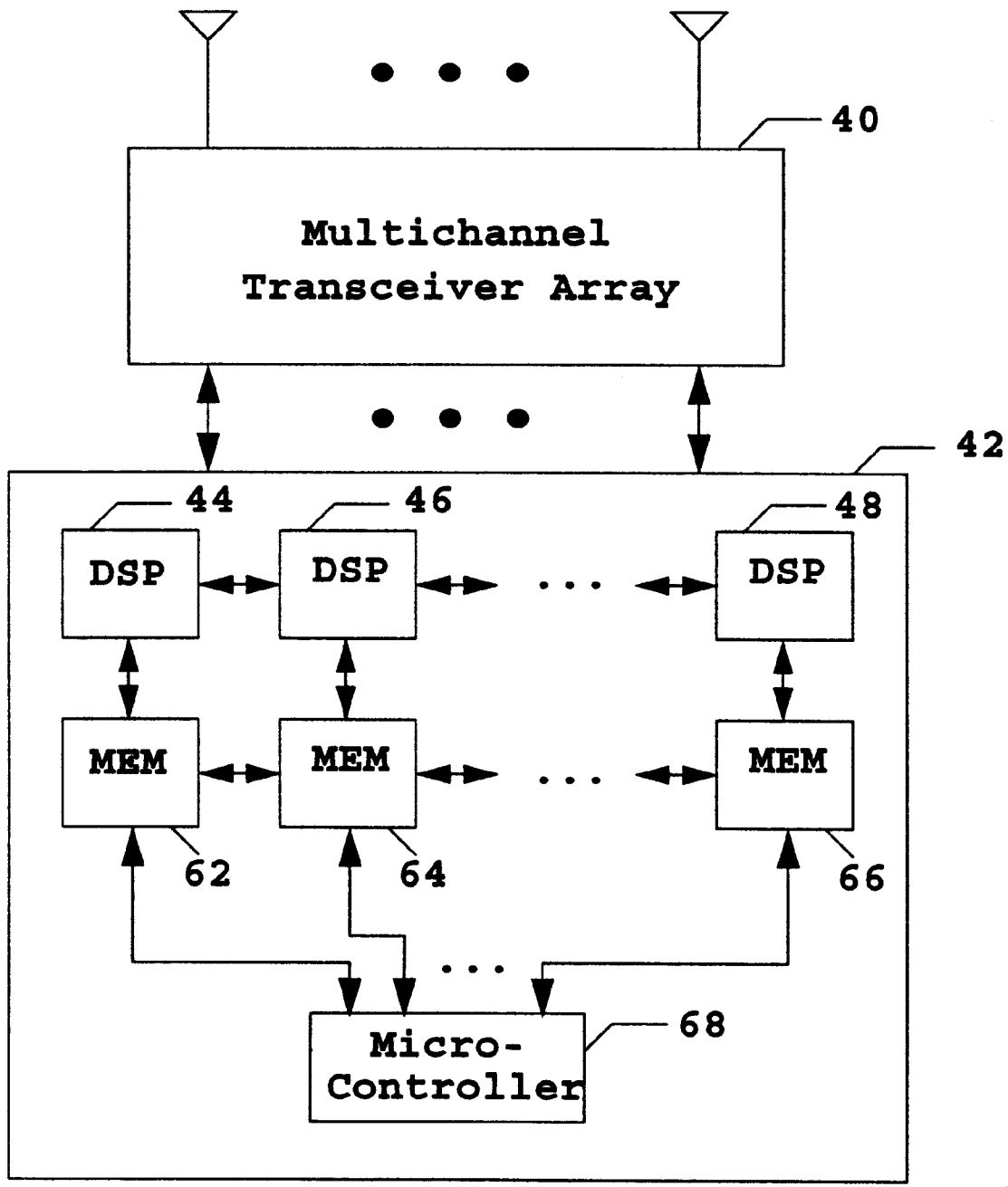
FIG. 5 illustrates one embodiment of the baseband processors in accordance with the invention.

FIG. 5 shows one embodiment of the baseband processors hardware. In the preferred embodiment, the baseband processors 42 comprise one or more digital signal processors (DSPs) 44, 46, and 48 and associated one or more memories 62, 64 and 66. The memories 62, 64 and 66 store code and data executable by the one or more DSPs 44, 46 and 48 to perform baseband functions. In other words, the one or more DSPs 44, 46 and 48 execute program code stored in memory units 62, 64, and 66 to realize all baseband functions. System operations are preferably administrated by a dedicated micro-controller 68. Different tasks may be realized using dedicated DSPs or by task-sharing. In one embodiment, the baseband processors 42 comprise a single DSP and a single memory. In the preferred embodiment, the baseband processors 42 comprise a plurality of DSPs and a plurality of memories. It is noted that the baseband processing may be implemented in various other manners, such as using one or more general purpose CPUs, one or more programmed microcontrollers, discrete logic, or a combination thereof.

Figure 6:
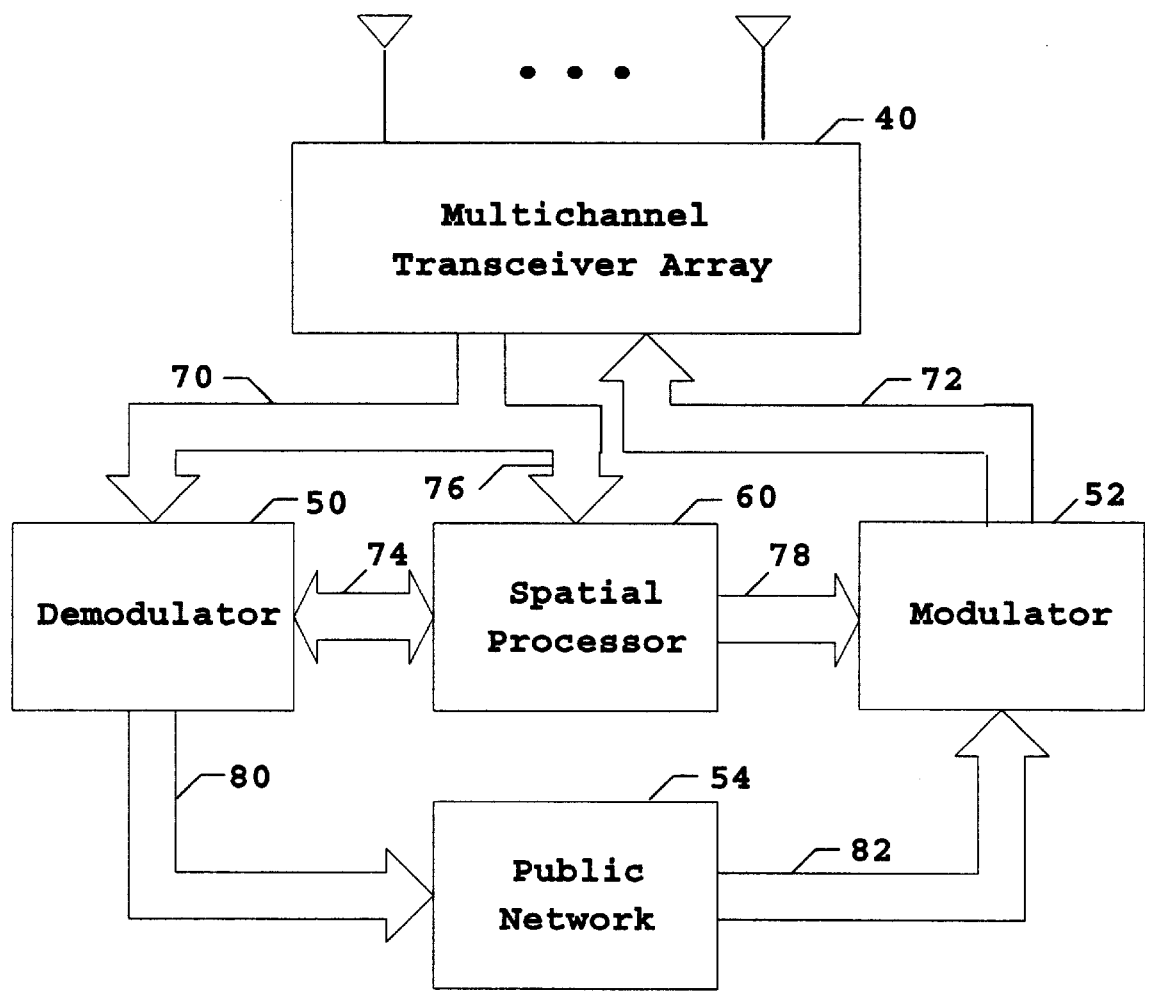
FIG. 6 is a block diagram of one embodiment of the SA-CDMA system in accordance with the invention.

FIG. 6 shows a block diagram of one embodiment of an SA-CDMA system. As shown, the multichannel transceiver array 40 is coupled to provide outputs to a spatial processor 60 and a demodulator 50. The spatial processor 60 and demodulator 50 are also preferably coupled together. The multichannel transceiver array 40 receives input from a modulator 52. The spatial processor 60 provides an output to the modulator 52. The demodulator 50 provides an output to the public network 54, and the public network 54 in turn provides an output to the modulator 52. As noted above with respect to FIG. 5, in the preferred embodiment the one or more DSPs 44,46, and 48 and associated one or more memories 62, 64 and 66 implement the various baseband functions. Thus in FIG. 6 the spatial processor 60, demodulator 50, and modulator 52 preferably comprise one or more programmed DSPs as described above. However, it is noted that one or more of the spatial processor 60, demodulator 50, and modulator 52 may be implemented in other ways, such as programmed CPUs or microcontrollers, and/or discrete logic, among other was as is known in the art.

Referring again to FIG. 6, during an uplink frame, the multichannel transceiver array 40 is set to the receiving mode so that superimposed uplink signals can be downconverted to baseband. The resulting combinations of multichannel uplink S-CDMA signals 70 are sent to the spatial processor 60 and the demodulator 50. The functions of the spatial processor 60 include estimating the spatial signatures, determining uplink power and timing offset of the terminals, and calculating the uplink and downlink beamforming matrices or vectors. In the present disclosure, the term "matrices" is intended to include both matrices and vectors, and the terms vectors and matrices are used interchangeably. The spatial signature estimates comprise the transfer function or transfer characteristics of a respective terminal and the multichannel transceiver array 40.

The demodulator 50 and modulator 52 are coupled to the spatial processor to realize baseband beamforming and S-CDMA modulation and demodulation. In particular, the main function of the demodulator 50 is to constructively combine signals from each terminal and recover the uplink messages using uplink beamforming matrices and other information provided by the spatial processor. In one embodiment of the invention, spatial processing and modulation/demodulation is realized in a batch mode—measurements 70 from the multichannel transceiver array are not processed until all data within an uplink frame is collected. In another embodiment, adaptive algorithms are used and information 74 are exchanged continuously between the demodulator 50 and the spatial processor 60. After demodulation, the demodulated uplink messages 80 are then rounted to the public network 54 depending on the applications.

After the uplink frame, the multichannel transceivers are switched to the transmission mode. Messages 82 destined for the terminals are obtained from the same public network 54. Downlink beamforming matrices 78 calculated based on previous spatial signature estimates are provided by the spatial processor 60 to the modulator 52. The modulator 52 modulates all downlink messages 82 and generates mixed multichannel downlink S-CDMA signals 72 to be transmitted by the multichannel transceiver array 40. In one embodiment, modulation involves code modulation of each signal, followed by downlink beamforming and digital combining. The resulting mixed digital signals are then applied for pulse shaping and digital-to-analog conversion. In another embodiment, code modulation, beamforming and digital combining are realized in one step using a Fast Hadamard transform, provided that Walsh orthogonal codes are utilized. Yet in another embodiment, D/A conversion is performed for individual message signals intended for different terminals and an analog combiner is used for mixing the resulting signals.

Figure 7:
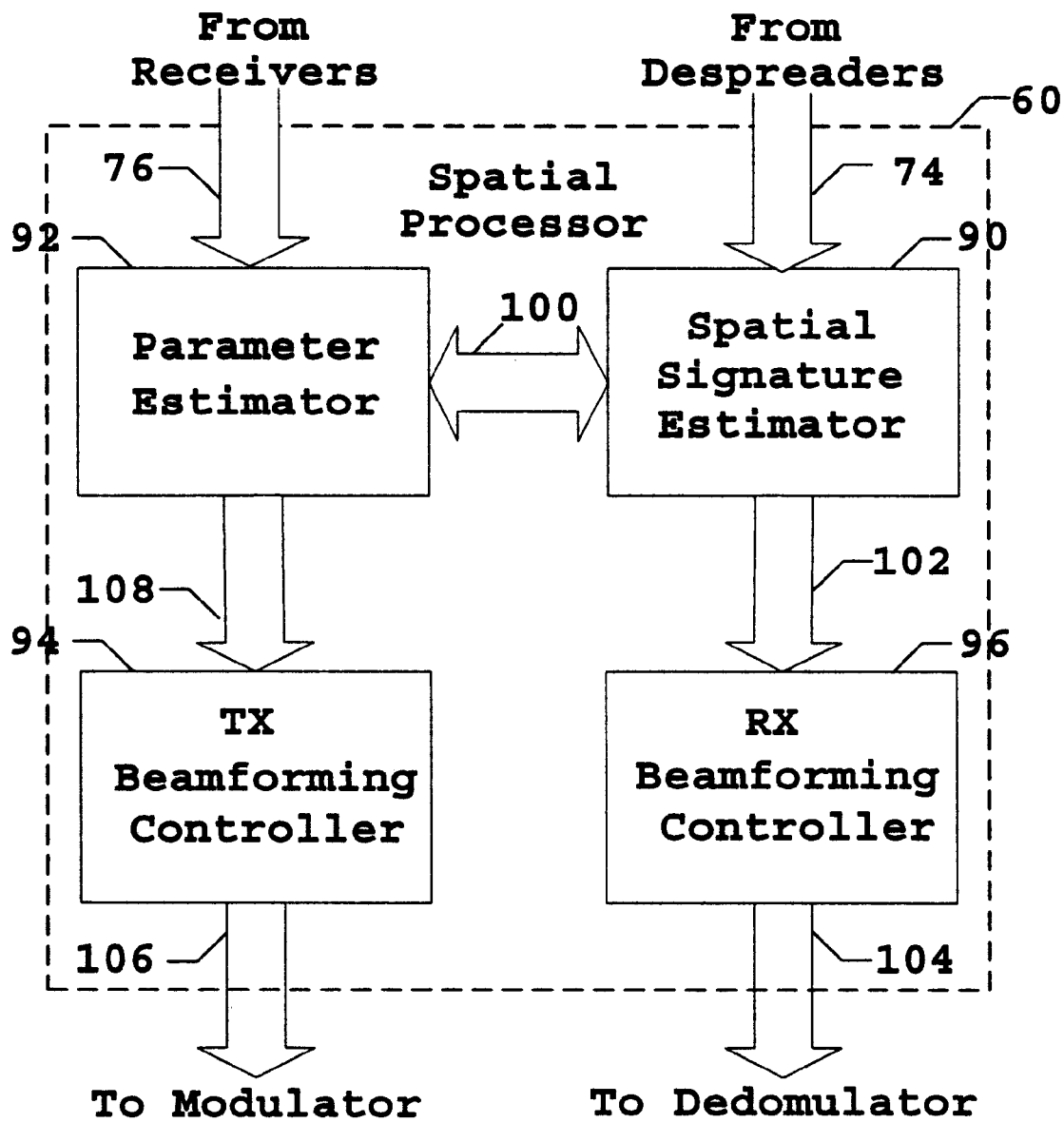
FIG. 7 is a block diagram of one embodiment of a spatial processor in accordance with the invention.

FIG. 7 is a more detailed block diagram illustrating the functional blocks comprising the spatial processor 60. The spatial processor 60 controls the uplink and downlink beamforming operations. The spatial processor 60 receives inputs 76 which are measurements from the array of receivers. In the examplary embodiment, the spatial processor 60 also receives inputs comprising the despread multichannel symbol sequence 74 for each terminal provided by despreaders in the demodulator 52. The spatial processor 60 includes a spatial signature estimator 90 which is dedicated to estimate spatial signatures. In one embodiment, the spatial signature of a respective terminal is calculated as the principal eigenvector of the data covariance matrix of the multichannel symbol sequence associated with the terminal. In another embodiment, the symbol sequence with maximum energy is identified from the multichannel symbol sequence, and the multichannel symbol sequence is then normalized with respect to the identified symbol sequence. The average of the resulting normalized multichannel symbol sequence is calculated as the spatial signature estimate.

In the preferred embodiment, the spatial processor 60 also includes a dedicated parameter estimator 92, which estimates signal parameters such as the uplink power and timing offset of the terminals. When necessary, the parameter estimator 92 also provide DOA estimates which can be used in geolocation and handoff. Thus the parameter estimator 92 estimates signal parameters other than the spatial signatures.

The spatial processor 60 includes an RX beamforming controller 96 and a TX beamforming controller 94 which are coupled to the spatial signature estimator 90. The RX beamforming controller 96 and TX beamforming controller 94 calculate the uplink and downlink beamforming matrices. The outputs of the RX and the TX beamforming controllers 94 and 96 are then passed along to the demodulator 50 and modulator 52 for spatial beamforming.

In one embodiment, timing offset is estimated from the receiver outputs using correlators well-known in the prior art. This is appropriate in situations where the sampling rate is sufficiently higher than the chip rate. In a second embodiment, a subspace timing estimation algorithm is used to provide high resolution estimates of the timing offsets. For more information on the subspace timing estimation algorithm, please see E. Strom et al., "Propagation delay estimation in asynchronous direct-sequence code-division multiple access systems", IEEE Trans. on Communications", vol. 44, no. 1, pp. 84–93, 1996), which is hereby incorporated by reference as though fully and completely set forth herein.

Uplink power and DOA estimation can be performed based on estimation of the spatial signatures. In one embodiment, the uplink power is calculated as the principal eigenvalue of a data covariance matrix of the multichannel symbol sequence associated with a respective terminal. In another embodiment, the uplink power is estimated as a quadratic mean of a beamformed symbol sequence associated with a respective terminal. In one embodiment, DOAs are determined by performing beamforming on individual spatial signatures. In another embodiment, high resolution DOA estimation algorithms are applied directly to the covariance matrix of the multichannel symbol sequence. In yet another embodiment, adaptive power and DOA estimation methods can be adapted to track the variations of these parameters. The DOA estimates, when used in conjunction with the timing offset, provides distance and direction information to locate the terminals, and thus may be used to facilitate handoff among different cells.

Thus the spatial processor 60 performs functions such as spatial signature estimation, constructing the uplink and downlink beamforming matrices or vectors for all terminals, and estimating signal parameters such as the uplink power and timing offset of the terminals.

Figure 8:
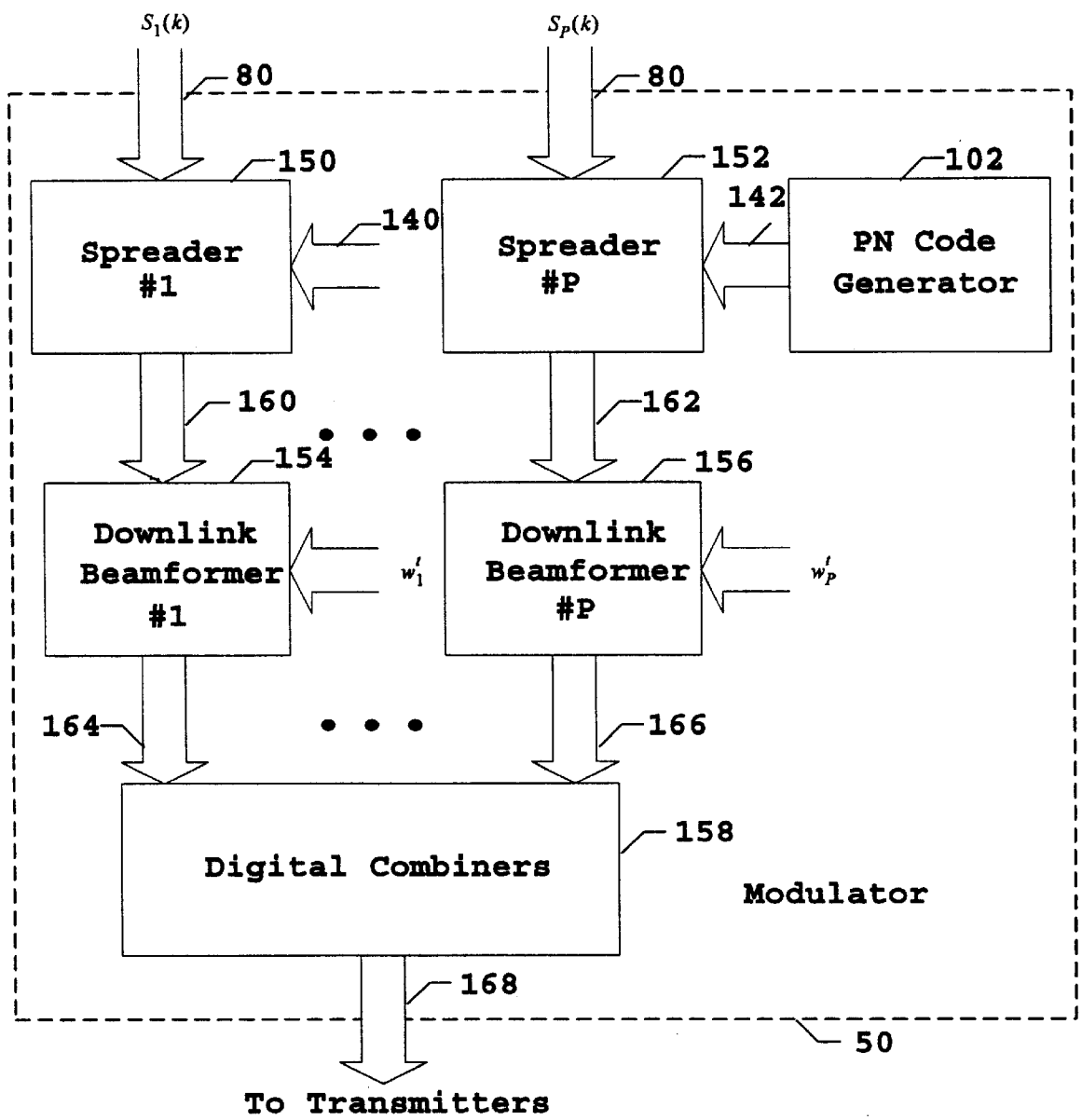
FIG. 8 illustrates one embodiment of a modulator of the disclosed SA-CDMA system in accordance with the present invention.

FIG. 8 illustrates an examplary embodiment of the modulator 50 in accordance with the present invention. The modulator 50 includes a plurality of spreaders 150 based on the number of terminals which are capable of communicating with the base unit. In the embodiment shown in FIG. 8, signals 80 intended for the terminals, e.g., $s_I(k)$ to $s_P(k)$ for terminal 1 to P, respectively, are first spread by spreaders 150,152 using PN code sequences 140,142 provided by a PN code generator 102. A set of downlink beamformers 144,146 are coupled to the spreaders to weight the resulting chip sequence 160,162 using downlink beamforming matrices ($w'_I$ to $w'_P$). The final step of the SA-CDMA Modulator 50 is combining the beamformed sequences and generating multichannel downlink S-CDMA signals 168. This is accomplished in the present embodiment by digital combiners 158. There exist many alternatives to realized the aforementioned modulation functions including a one step method disclosed in copending patent application Ser. No. 08/779,263 entitled "Method and Apparatus for Fast Modulation in Antenna Array CDMA Communications", which is hereby incorporated by reference.

Figure 9:
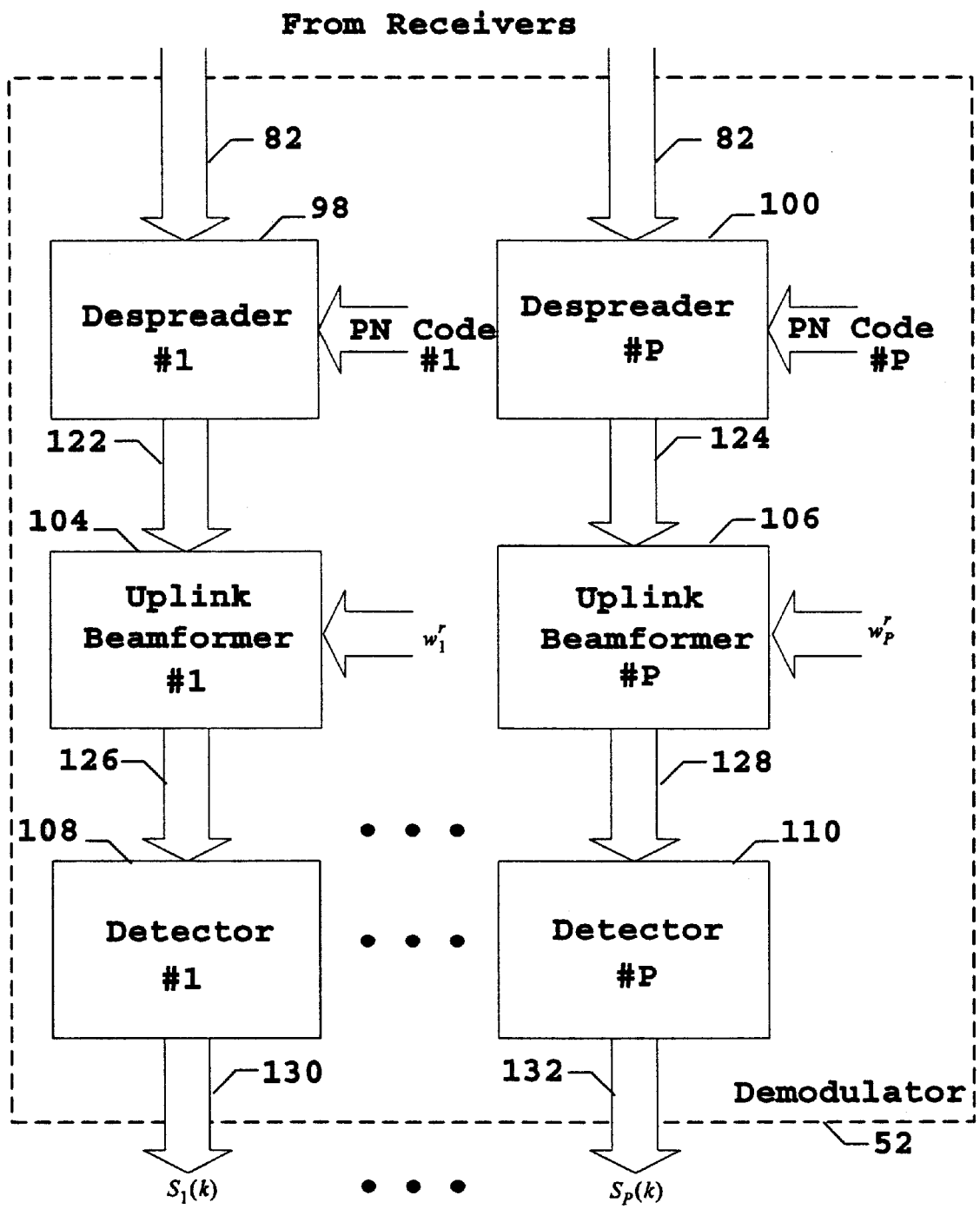
FIG. 9 illustrates one embodiment of a demodulator of the disclosed SA-CDMA system in accordance with the present invention.

An embodiment of an SA-CDMA demodulator 52 is depicted in FIG. 9. The configuration of the demodulator 52 is reversed in structure to the modulator 50. Despreaders 98,100 are coupled to the multichannel transceiver array (configured to be receivers) to despread multichannel uplink S-CDMA signals 82 for each terminal using a PN code sequence provided by the PN Code generator 102. The outputs of the despreaders are multichannel symbol sequences 122,124 for different terminals. For each terminal, an uplink beamformer 104 or 106 is coupled to the despreader that provides a multichannel symbol sequence for this terminal. The uplink beamformer obtains enhanced signals 126, 128 by combining the corresponding multichannel symbol sequence using its associated uplink beamforming matrix ($w'_I$ to $w'_P$). The beamforming outputs 126,128 are passed along to detectors 108,110 where message data ($s_I(k), \ldots, s_P(k)$) from the terminals are detected as in the current art.

The modulation and demodulation schemes described above assume ideal multichannel transceivers with no hardware imbalance. In practice however, hardware imperfection is inevitable. To cope with this, system calibration is generally required. Throughout the discussion herein, it is assumed that compensation of receiver circuits are performed before estimation of spatial signatures, whereas compensation of transmitter circuits are performed before the transmission of multichannel downlink S-CDMA signals.

Operation of the Invention

Having described the block structure of the present SA-CDMA system, the following describes the operations of the present invention in more detail.

In current practice of TDD communications, uplink signals from remote terminals are received by the base station during an uplink frame. The base station demodulates the message signals and either exchanges and sends them back to the terminals or relays them to a network, depending on the application. Immediately after the uplink frame is a downlink frame in which the base station sends modulated messages to the terminals. The present invention adopts the same duplexing format as described above.

Figure 10:
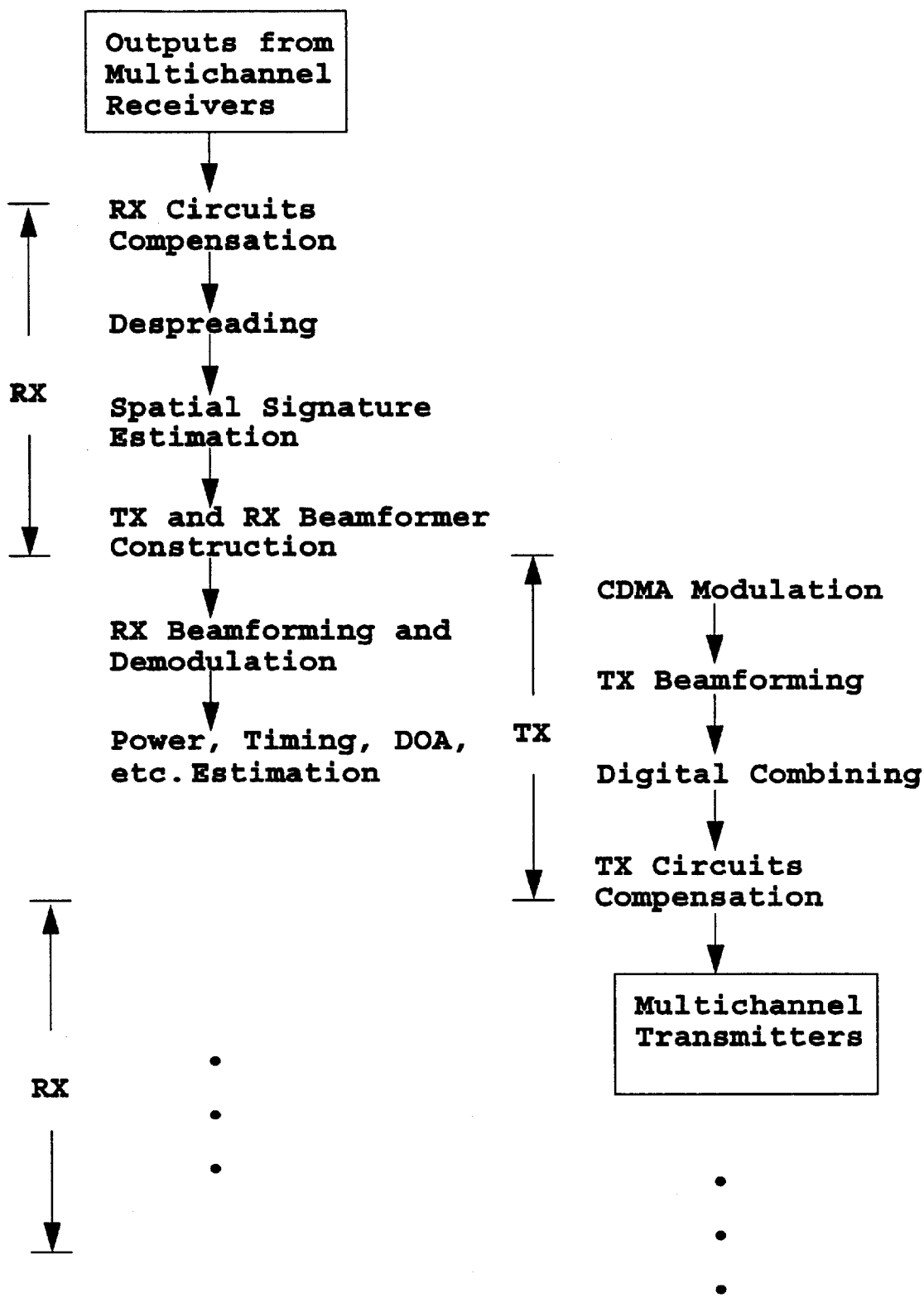
FIG. 10 diagrams one embodiment of SA-CDMA operations in an uplink and a downlink frames in accordance to the present invention.

FIG. 10 diagrams an exemplary operational flow of the disclosed TDD smart antenna CDMA system. Starting from reception of an uplink frame, outputs from the multichannel transceiver array 40 are first compensated with receiver circuit calibration matrices or vectors before other operations. Once the receiver hardware imbalance is accounted for, combinations of uplink S-CDMA signals are despread to produce multichannel symbol sequences for different terminals. As noted above, the combinations of uplink S-CDMA signals are despread for each of the terminals using the PN code sequence for each of the terminals.

After despreading, the resulting signals are applied for spatial signature estimation. Spatial signature estimation is performed to determine the transfer function or transfer characteristics of the transmission path between each terminal and the base station. During the uplink frame, the downlink beamforming matrices are constructed so that they can be used in the following downlink frame. The downlink beamforming matrices for each terminal are preferably constructed based on the spatial signature estimates for each respective terminal. In the preferred embodiment, the remaining RX operations such as uplink beamforming, demodulation, and parameter estimation, do not have to be completed within the uplink frame.

Upon completion of uplink, message data destined for remote terminals are first modulated as in conventional S-CDMA systems. Downlink beamforming is performed using the downlink beamforming matrices calculated. To complete the baseband TX processing, all beamformed signals are combined, and transmitter hardware imbalances are compensated. The resulting signals are then applied to the multichannel transmitters for transmission to the terminals. The above procedure repeats itself in a TDD manner.

For detailed operations, consider a base station system with M antennas connected to M coherent transceivers. During the uplink frame, the base station transceivers are set at the reception mode and the superimposed signals from P terminals are downconverted and sampled by an array of receivers. For illustration purpose, it is assumed that K symbols are transmitted from remote terminals. Each symbol is spread into L chips based on the pre-assigned PN code sequence. Denote $y_m(k,n)$ the nth sample during the kth symbol period from the mth receiver, then $$y_m(k, n) = \sum_{i=1}^{P} a_{i,m} s_i(k) p_i(k, n) + e_m(k, n),$$

where $s_i(k)$ is the kth symbol from the ith terminal; $p_i(k,n)$ n=1 . . . L, are the spreading PN code for the kth symbol, $a_{i,m}$ is the complex response of the mth antenna to signals from the ith terminal, and $e_m(k,n)$ repeats the overall interference.

$\alpha_{i,m}$ from all antennas, i.e., $\alpha_i=[\alpha_{i,1} \ldots \alpha_{i,M}]^T$, constitutes a spatial signature which represents the spatial characteristics of the ith terminal and the base antenna array. In applications where the propagation channels are frequency-selective with long delay multipath, the spatial signature becomes a matrix instead of a vector to describe the memory effects of the channel. For more information, please refer to H. Liu and M. Zoltowski, "Blind Equalization in Antenna Array CDMA Systems", IEEE Trans. on Signal Processing, January, 1997; D. Johnson and D. Dudgen, "Array Signal Processing, Concepts and Techniques", Prentice Hall, 1993. For simplicity, the discussion is limited to frequency non-selective channels and all SA-CDMA operations are discussed based on vector spatial signatures.

The objective of demodulation is recover the informative bearing message data, i.e., $s_i(k)$, from each terminal utilizing its associated PN code sequence and spatial signature. To achieve this, one needs to estimate the spatial signature of the terminals and accordingly calculate the uplink and downlink beamforming matrices (vectors in this case) for spatial beamforming.

Figure 11:
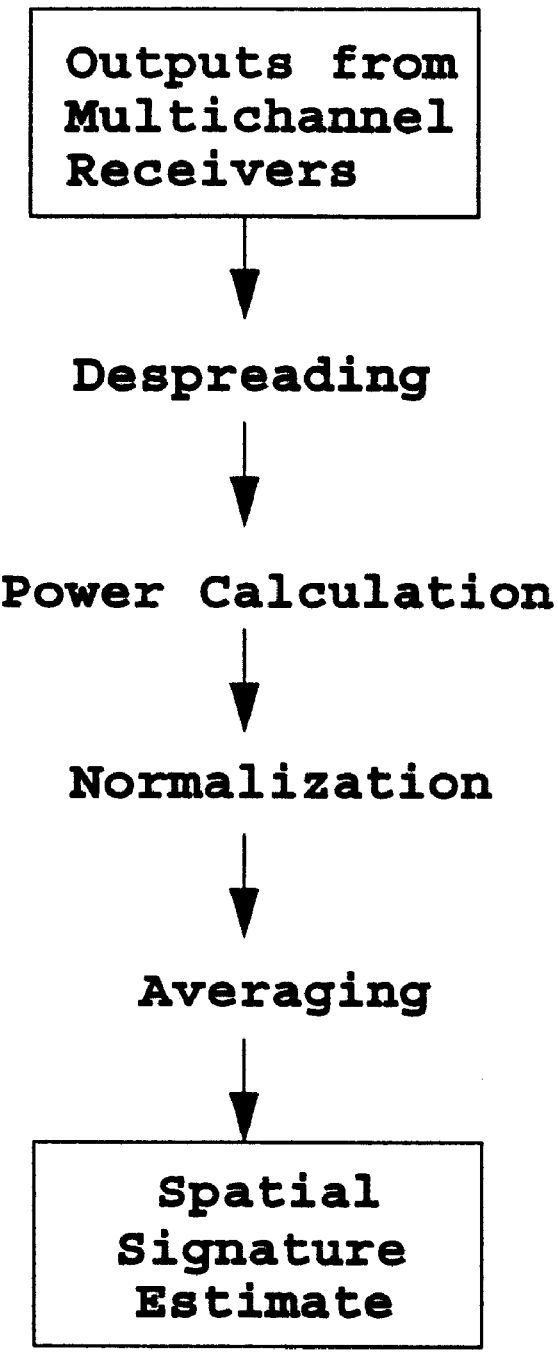
FIG. 11 diagrams one embodiment of spatial signature estimation operations in accordance to the present invention.

FIG. 11 diagrams one embodiment of the estimation procedure. For each terminal, despreading is first performed on $y_m(k,n), m=, \ldots, M$, . If $s_i(k)$ is the signal of interest (SOI), the despreading can be mathematically described as, $$x_m^i(k) = \sum_{n=1}^{L} y_m(k, n) p_i(k, n), m = 1, \ldots, M.$$

Stacking $x_m^i(k)$ from all antennas in a vector form yields $$x^i(k) = [x_1^i(k) \ldots x_M^i(k)]^T$$

where T denotes transposition. Following despreading, the signal power of each symbol sequence is calculated as $$\sum_{k} |x_m^i(k)|^2, m = 1, \ldots, M.$$

The spatial signature estimate can be obtained by element averaging the following normalized multichannel symbol sequence, $$x^i(k)/x_m^i(k) = ([x_1^i(k) \ldots x_M^i(k)]^T/x_m^i(k)), k=1, \ldots, K$$

where m is the index of the symbol sequence with maximum signal power.

Figure 12:
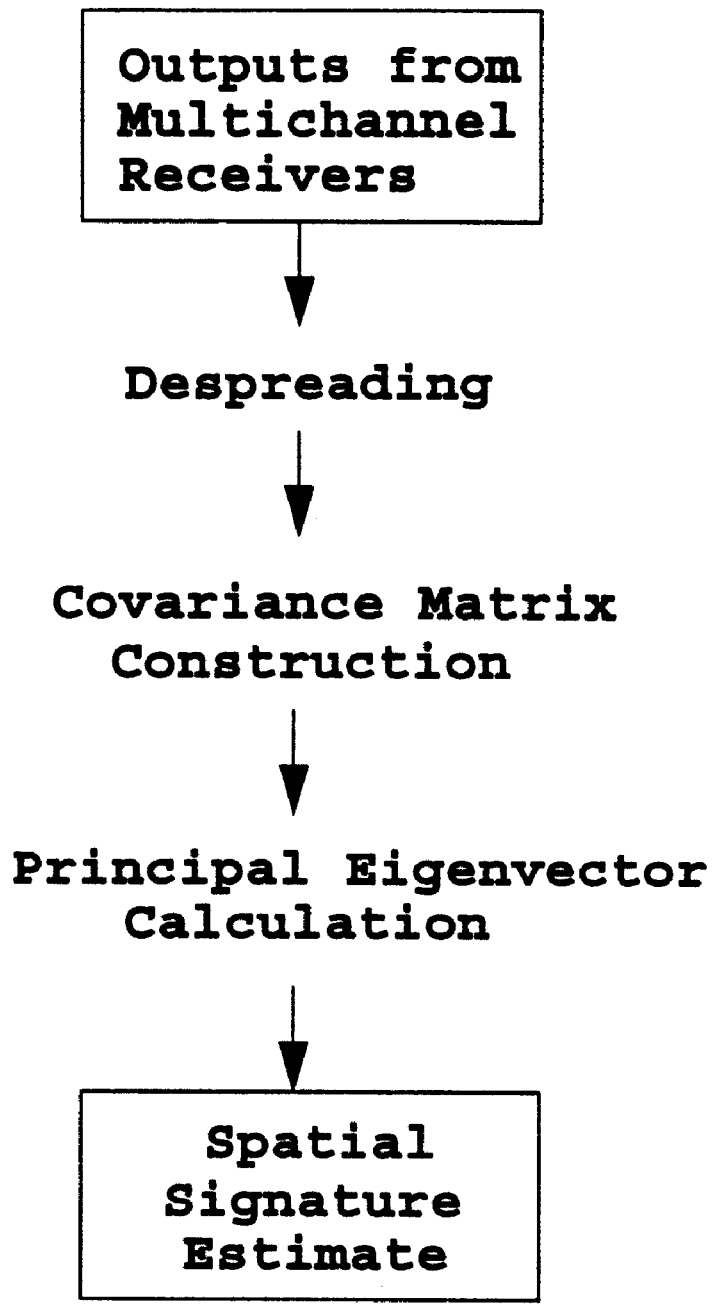
FIG. 12 diagrams another embodiment of spatial signature estimation operations according to the present invention.

Alternatively, in another embodiment illustrated in FIG. 12, a data covariance matrix is formed given the multichannel symbol sequence of terminal i, $$R_{x^i} = \sum_{k=1}^{N} x^i(k) x^{i^H}(k)$$

The spatial signature of the ith user, $\alpha_i = [\alpha_{i,1} \ldots \alpha_{iM}]^T$, is readily determined as the principal eigenvector of the above covariance matrix. Well-known mathematical techniques such as eigen-decompositions (EVDs) and singular-value decompositions (SVDs) can be used. The capability of accurately identifying the spatial signatures of the terminals without involving computationally demanding operations is unique to this invention.

Once the spatial signature estimates are available, the RX beamforming controller 96 begins the construction of uplink beamforming matrices or vectors, $$w_i^F = [w_i^F(1) \ldots w_i^F(M)]^T, i, \ldots, P$$

The resulting matrices or vectors are used to combine all symbol sequences in the multichannel symbol sequence to form a beamformed symbol sequence for each terminal as follows, $$\hat{s}_i(k) = \sum_{m=1}^{M} w_i^r(m) x_m^i(k) \quad i = 1, \ldots, P$$

Please refer to D. Johnson and D. Dudgen, "Array Signal Processing, Concepts and Techniques", Prentice Hall, 1993, for more details on the uplink beamforming defined above.

Because of despreading and uplink beamforming, the signal-to-interference ratio (SIR) of $\hat{s}_i$ is significantly increased. Consequently, the capacity and quality of wireless communications is proportionally increased. The enhanced signal can then sent to signal detectors (108,110) for detection as is well known is prior art.

In one embodiment, for at least of subset of the terminals, the uplink beamforming vector is identical to the spatial signature estimate of the terminal. In another embodiment, noise characteristics as well as other spatial parameters are accounted for so that the maximum signal-to-interference-and-noise ratio (SINR) uplink beamforming vector can be constructed to yield better results. In yet another embodiment, the uplink beamforming vectors are designed to minimize the bit-error-rate (BER) for the terminals. A variety of techniques can be utilized to realize the above functions.

Similarly, the transmission beamforming vectors are constructed by the TX beamforming controller 94 based on the spatial signature estimates. Again in one embodiment, for at least a subset of terminals, the downlink beamforming vectors are identical to its corresponding spatial signature estimate. Other more sophisticated algorithms using different criteria, e.g., maximum SINR and minimum BER, can be employed to design the downlink beamforming vectors for better performance.

Following reception, the multichannel transceivers are configured to be in the transmission mode. Symbols sequences desinated to the remote terminals are code modulated as is done in current S-CDMA systems, and then beamformed and combined before applied to the transmitters. In the preferred embodiment, the above functions are realized digitally. The mth signal sequence to be transmitted from the mth transmitter of can be mathematically represented as $$y_m(k, n) = \sum_{i=1}^{P} w_i^t(m) s_i(k) p_i(k, n)$$

each symbol, $s_i(k)$ (denoted using the same notation as in the uplink for simplicity), is spread using a predetermined PN code sequence, $p_i(k,n)$. $w_i^t(m)$ is the mth downlink beamforming coefficient for the ith terminal. Please refer to D. Johnson and D. Dudgen, "Array Signal Processing, Concepts and Techniques", Prentice Hall, 1993, for more details on the downlink beamforming defined above. Note that although the same PN codes in uplink are used in the above expression, this is not a restriction of the current invention.

By feeding $y_m(k,n)$, m=1, . . . , M to the array of transmitters, each message is delivered through a different spatial channel determined by the downlink beamforming vector, $w_i^t = [w_i^t(1) \ldots w_i^t(M)]$. Each message is also represented by a distinctive code sequence to distinguish it from the others. This way, code and spatially selective transmission is accomplished. The capability of maximizes the performance with simple and robust operations is unique to this invention.

The above procedure is a batch-mode embodiment of the SA-CDMA scheme in accordance with the invention. In another embodiment, the spatial signature estimation, beamforming vectors construction, as well as the uplink and downlink beamforming, can be implementation using adaptive algorithms, such as adaptive subspace tracking and recursive beamforming, etc., all well-known in prior art. In even more sophisticated embodiment, the efficacy of spatial beamforming can be fed back to the base station from the terminals to further performance enhancement.

The above discussion concerns the two basic operations, namely, modulation and demodulation, in an SA-CDMA system. In addition to providing beamforming vectors for the basic transmission and reception operations, the Spatial Processor (60) also provides necessary signal parameters to maintain the reliable wireless link. In particular, the Parameter Estimator (92) determines the uplink power and timing offset associated with each terminal. The power estimation can be used for closed-loop power control whereas the timing offset estimation is required for synchronization.

In one embodiment, the timing offset is estimated by correlating received signals a terminal's PN code sequence at different delays and then locating the peak of the correlator outputs—a technique well-known in the prior art. The timing offset is then fed back to this terminal in the following transmission frames for synchronization.

Compared to timing adjustment, power control needs to be done more frequently since channel variations may be rapid in a mobile environment. In one embodiment, the quadratic mean of the multichannel symbol sequence, $x^i(k)$, can be used as the power estimate for the terminal. In another embodiment, the principal eigenvalue of the covariance matrix $R_x$, provides more accurate estimate of the transmission power. In another embodiment, the uplink power is estimated as the quadratic mean of the beamformed symbol sequence $\hat{s}_i$. In yet another embodiment, more accurate power estimation can be accomplished by taking into account of the noise contribution of the power of the beamformer outputs.

The covariance matrix $R_x$, and/or the spatial signature $\alpha_i$ associated with the ith terminal contains all its spatial information can thus can provide detailed spatial parameters such as the DOAs, number of multipath reflections, etc. Many techniques well-known in the art can be utilized. Contrasting to the conventional approaches which utilize the covariance matrix of the receiver outputs, is the fact that estimation of spatial parameters of each terminal is accomplished in two steps. The first step isolates the spatial information for each terminal into the covariance matrix or spatial signature estimates, whereas the second step provides details information based on these estimates. This way, the total number of DOAs to be estimated in one step is significantly reduced to that associated with one terminal, leading to more accurate estimates, and the troublesome associate problem is also avoided.

The DOA estimates can be used in conjunction with timing offset estimation to provide precise location information of the terminals. The capability to provide both direction and distance information of the terminals is unique to the present invention. Such information can be used to facilitate hand-off and other services which require location information. The fact that DOA estimates can be obtained straighforwardly using spatial signature estimates also enable the current invention to be applied to current and future FDD S-CDMA systems with minimum modifications.

While the above description contains certain specifications, these should not be construed as limitations on the scope of the invention, but rather as an exemplification of one preferred embodiment and application thereof. It will be apparent to those skilled in the art that various modifications can be made to the smart array S-CDMA communications system and method of the instant invention without departing from the scope or spirit of the invention, and it is intended that the present invention cover modifications and variations of the antenna array communications system and method provided they come in the scope of the appended claims and their equivalents.

What is claimed is:

1. A time division duplex (TDD) antenna array synchronous code division multiple access (S-CDMA) communications system for communicating message data to/from a plurality of terminals, comprising:

a multichannel transceiver array comprising a plurality of antennas and a plurality of transceivers, wherein said multichannel transceiver array is adapted for receiving combinations of multichannel uplink S-CDMA signals from said terminals and transmitting multichannel downlink S-CDMA signals towards said terminals, wherein said multichannel transceiver array is adapted for receiving said combinations of multichannel uplink S-CDMA signals from said terminals and transmitting multichannel downlink S-CDMA signals towards said terminals during different time frames in a time division duplex manner;

a spatial processor coupled to said multichannel transceiver array for determining spatial signature estimates associated with said terminals from said combinations of multichannel uplink S-CDMA signals, wherein said spatial processor is also operable to calculate uplink and downlink beamforming matrices based on the spatial signature estimates;

a demodulator coupled to said spatial processor and said multichannel transceiver array for determining estimates of uplink messages from said terminals from said combinations of multichannel uplink S-CDMA signals; and a modulator coupled to said multichannel transceiver array for generating said multichannel downlink S-CDMA signals to transmit messages destined for said terminals.

2. The TDD antenna array CDMA communications system as defined by claim 1, wherein each of said terminals includes a unique PN code sequence, the system further comprising:

a despreader coupled to said demodulator and said spatial processor, wherein, for each of said plurality of terminals, said despreader uses the terminal's PN code sequence to despread said combination of multichannel uplink S-CDMA signals to obtain a multichannel symbol sequence, wherein said multichannel symbol sequence comprises a plurality of symbol sequences;

wherein said spatial processor produces said spatial signature estimate in response to said multichannel symbol sequence.

3. The TDD antenna array CDMA communications system as defined by claim 2, wherein said spatial processor identifies a symbol sequence from said multichannel symbol sequence with a maximum signal power and further operates to normalize said multichannel symbol sequence with respect to said identified symbol sequence with the maximum signal power to obtain a normalized multichannel symbol sequence; and wherein said spatial processor operates to calculate the average of said normalized multichannel symbol sequence to produce said spatial signature estimate.

4. The TDD antenna array S-CDMA communications system as defined by claim 2, wherein said spatial processor forms a data convariance matrix of said multichannel symbol sequence;

wherein said spatial processor calculates the principal eigenvector of said data covariance matrix as said spatial signature estimate.

5. The TDD antenna array S-CDMA communications system as defined by claim 1, wherein said spatial processor is operable to determine individual multipath parameters including direction of arrival (DOA) estimates associated with each of said terminals;

wherein said DOA estimates are used in locating said terminals and in assisting handoff.

6. The TDD antenna array S-CDMA communications system as defined by claim 5, wherein said spatial processor determines DOA estimates based on a respective terminal's spatial signature estimate.

7. The TDD antenna array S-CDMA communications system as defined by claim 5, wherein said spatial processor determines DOA estimates based on a data covariance matrix of a multichannel symbol sequence associated with a respective terminal.

8. The TDD antenna array S-CDMA communications system as defined by claim 1, wherein said spatial processor determines an uplink power estimate associated with each of said terminals;

wherein said uplink power estimate is used for power control;

wherein said spatial processor determines said uplink power as the principal eigenvalue of a data covariance matrix of a multichannel symbol sequence associated with a respective terminal.

9. The TDD antenna array S-CDMA communications system as defined by claim 1, wherein said spatial processor determines an uplink power estimate associated with each of said terminals;

wherein said uplink power estimate is used for power control;

wherein said spatial processor determines said uplink power as a quadratic mean of a beamformed symbol sequence associated with a respective terminal.

10. The TDD antenna array S-CDMA communications system as defined by claim 1, wherein said spatial processor determines timing offset estimates associated with each of said terminals, wherein said timing offset estimates are used for synchronization of said terminals.

11. The TDD antenna array S-CDMA communications system as defined by claim 1, wherein said spatial processor further includes:

means for determining individual multipath parameters including direction of arrival (DOA) estimates associated with each of said terminals, wherein said DOA estimates are used in assisting handoff;

means for determining timing offset estimates associated with each of said terminals, wherein said timing offset estimates are used for synchronization; and means for determining the geolocation of a respective terminal by combining said DOA estimates and distance information provided by said timing offset estimates.

12. The TDD antenna array S-CDMA communications system as defined by claim 1, wherein each of said terminals includes a unique PN code sequence, the system further comprising:

a despreader coupled to the demodulator and the spatial processor, wherein, for each of said terminals, said despreader operates to despread said multichannel uplink S-CDMA signals to obtain an associated spatial signature estimate, wherein, for each respective terminal of said plurality of terminals, said despreader uses said respective terminal's PN code sequence to despread said combination of multichannel uplink S-CDMA signals to obtain a multichannel symbol sequence, wherein said multichannel symbol sequence comprises a plurality of symbol sequences for each of the transceivers comprised in the multichannel transceiver array;

wherein the demodulator is coupled to the despreader and receives said multichannel symbol sequence output from said despreader, wherein said demodulator includes:

an uplink beamformer for obtaining enhanced signals for a respective terminal by combining said multichannel symbol sequence using said respective terminal's uplink beamforming matrix; and a detector for determining message data transmitted by said respective terminal from said enhanced signals;

wherein code and spatial diversities are both used to suppress interference and noise in signal reception.

13. The TDD antenna array S-CDMA communications system as defined by claim 1, wherein said modulator includes:

a PN code generator for providing PN codes for each of said terminals;

a spreader coupled to said PN code generator for generating S-CDMA signals for each of said terminals, wherein said spreader uses a respective PN code for each of said terminals in generating said S-CDMA signals for each of said terminals;

a downlink beamformer for producing beamformed S-CDMA signals for each of said terminals, wherein said downlink beamformer uses said transmit beamforming matrices associated with each of said terminals in producing said beamformed S-CDMA signals for each of said terminals; and a combiner for combining said beamformed S-CDMA signals to produce said multichannel downlink S-CDMA signals;

wherein code and spatial diversities are both used to suppress interference and noise in signal transmission.

14. The TDD antenna array S-CDMA communications system as defined by claim 1, wherein, for at least a subset of said terminals, the uplink beamforming matrix for a respective terminal is identical to the spatial signature estimate for said respective terminal.

15. The TDD antenna array S-CDMA communications system as defined by claim 1, wherein, for at least a subset of said terminals, the uplink beamforming matrix for a respective terminal is constructed based on the spatial signature estimates of each of said terminals to maximize a signal-to-interference-and-noise ratio (SINR) for said respective terminal.

16. The TDD antenna array S-CDMA communications system as defined by claim 1, wherein, for at least a subset of said terminals, the uplink beamforming matrix for a respective terminal is constructed based on the spatial signature estimates of each of said terminals to minimize a bit-error-rate (BER) for said respective terminal.

17. The TDD antenna array S-CDMA communications system as defined by claim 1, wherein, for at least a subset of said terminals, the downlink beamforming matrix for a respective terminal is identical to the spatial signature estimate for said respective terminal.

18. The TDD antenna array S-CDMA communications system as defined by claim 1, wherein, for at least a subset of said terminals, the downlink beamforming matrix for a respective terminal is constructed based on the spatial signature estimates of each of said terminals to maximize a signal-to-interference-and-noise ratio (SINR) for said respective terminal.

19. The TDD antenna array S-CDMA communications system as defined by claim 1, wherein, for at least a subset of said terminals, the downlink beamforming matrix for a respective terminal is constructed based on the spatial signature estimates of each of said terminals to minimize a bit-error-rate (BER) for said respective terminal.

20. The TDD antenna array S-CDMA communications system as defined by claim 1, wherein each of said transceivers in said multichannel transceiver array comprises transmitter circuits and receiver circuits;

the system further comprising:

means for calibrating said multichannel transceiver array to correct for imbalance of said multichannel transceivers;

wherein said means for calibrating said receiver circuits operates before estimation of said spatial signatures;

wherein said means for calibrating said transmitter circuits operates before the transmission of said multichannel downlink S-CDMA signals.

21. The TDD antenna array S-CDMA communications system as defined by claim 1, wherein said spatial processor, said demodulator and said modulator are implemented by one or more digital processors.

22. A TDD antenna array S-CDMA communications method for communicating message data between a base station and a plurality of terminals, comprising receiving, using multichannel receivers, combinations of uplink S-CDMA signals during an uplink frame at said base station;

despreading, using terminals' PN code sequences, to obtain despread multichannel results for each of said terminals;

estimating a spatial signature associated with each of said terminals from said despread multichannel results, thereby producing spatial signature estimates for each of said terminals, generating receive and transmit beamforming vectors or matrices based on said terminals' spatial signature estimates;

uplink beamforming said despread multichannel results using said receive beamforming vectors or matrices to obtain enhanced signals for each of said terminals;

demodulating said enhanced signals to recover message data from each of said terminals;

modulating message data to obtain S-CDMA signals for each of said terminals;

downlink beamforming said S-CDMA signals using said transmit beamforming matrices to obtain beamformed S-CDMA signals for each of said terminals;

combining all of said beamformed S-CDMA signals to obtain downlink multichannel S-CDMA signals;

transmitting, in a downlink frame following said uplink frame, said combinations of downlink S-CDMA signals.

23. A time division duplex (TDD) antenna array synchronous code division multiple access (S-CDMA) communications system for communicating message data to/from a plurality of terminals, comprising:

a multichannel transceiver array comprising a plurality of antennas and a plurality of transceivers, wherein said multichannel transceiver array is adapted for receiving combinations of multichannel uplink S-CDMA signals from said terminals and transmitting multichannel downlink S-CDMA signals towards said terminals, wherein said multichannel transceiver array is adapted for receiving said combinations of multichannel uplink S-CDMA signals from said terminals during a first time frame and is adapted for transmitting multichannel downlink S-CDMA signals towards said terminals during a second time frame in a time division duplex manner;

spatial signature estimation means coupled to said multichannel transceiver array for determining spatial signature estimates associated with said terminals from said combinations of multichannel uplink S-CDMA signals, wherein said spatial signature estimation means is also operable to calculate uplink and downlink beamforming matrices based on the spatial signature estimates;

demodulator means coupled to said spatial signature estimation means and said multichannel transceiver array for determining estimates of uplink messages from said terminals from said combinations of multichannel uplink S-CDMA signals, and modulator means coupled to said multichannel transceiver array for generating said multichannel downlink S-CDMA signals to transmit messages destined for said terminals.

24. The TDD antenna array S-CDMA communications system as defined by claim 23, wherein each of said terminals includes a unique PN code sequence, the system further comprising:

despreader means coupled to said demodulator means and said spatial signature estimation means, wherein, for each of said plurality of terminals, said despreader means uses the terminal's PN code sequence to despread said combination of multichannel uplink S-CDMA signals to obtain a multichannel symbol sequence, wherein said multichannel symbol sequence comprises a plurality of symbol sequences;

wherein said spatial signature estimation means operates to determine said spatial signature estimate in response to said multichannel symbol sequence.

25. The TDD antenna array S-CDMA communications system as defined by claim 24, wherein said spatial signature estimation means identifies a symbol sequence from said multichannel symbol sequence with a maximum signal power and further operates to normalize said multichannel symbol sequence with respect to said identified symbol sequence with the maximum signal power to obtain a normalized multichannel symbol sequence; and wherein said spatial signature estimation means operates to calculate the average of said normalized multichannel symbol sequence to produce said spatial signature estimate.

26. The TDD antenna array S-CDMA communications system as defined by claim 24, wherein said spatial signature estimation means forms a data convariance matrix of said multichannel symbol sequence;

wherein said spatial signature estimation means calculates the principal eigenvector of said data covariance matrix as said spatial signature estimate.

27. The TDD antenna array S-CDMA communications system as defined by claim 23, wherein said spatial signature estimation means further includes:

means for determining individual multipath parameters including direction of arrival (DOA) estimates associated with each of said terminals;

wherein said DOA estimates are used in locating said terminals and in assisting handoff.

28. The TDD antenna array S-CDMA communications system as defined by claim 23, wherein said spatial signature estimation means further includes, means for determining an uplink power estimate associated with each of said terminals;

wherein said uplink power estimate is used for power control.

29. A smart antenna base station comprising:

a spatial signature estimator means for estimating a plurality of spatial signatures associated with a plurality of uplink signals received from a corresponding plurality of remote terminals wirelessly coupled to the base station, the plurality of uplink signals simultaneously received on a common carrier frequency during an uplink time slot;

a downlink beamformer means coupled to said spatial signature estimator means and responsive to the plurality of spatial signatures for beamforming a plurality of downlink beamforms correspondingly unique to each of the plurality of remote terminals and for simultaneously transmitting a plurality of downlink signals to the plurality of remote terminals on the common carrier frequency during a downlink time slot subsequent to the uplink time slot; and a code division multiple access modulator means coupled to said downlink beamformer means for code modulating each of the plurality of downlink signals on a corresponding plurality code channels whereby each of the plurality of downlink signals has a unique downlink beamform and a unique code channel on the common carrier frequency;

a parameter estimator means coupled to said spatial signature estimator means for further processing at least one of the plurality of spatial signatures for determining a corresponding direction of arrival vector associated with a remote terminal of the plurality of remote terminals, wherein said downlink beamformer means is not dependent upon the direction of arrival vector for beamforming a downlink beamform associated with the remote terminal.

30. The smart antenna base station according to claim 29 wherein said spatial signature estimator means determines a timing offset unique to each of the plurality of remote terminals for communication thereto, thereby enabling synchronization of each of the plurality received uplink signals.

31. The smart antenna base station according to claim 29 wherein at least one of the plurality of downlink beamforms is substantially identical to a corresponding at least one of the plurality of spatial signatures.

32. The smart antenna base station according to claim 29 wherein at least one of the plurality of downlink beamforms is optimized for maximum signal-to-interference-and noise performance by accounting for noise characteristics as well as other spatial parameters.

33. The smart antenna base station according to claim 29 wherein at least one of the plurality of downlink beamforms is optimized for maximum bit-error-rate performance by accounting for noise characteristics as well as other spatial parameters.

34. The smart antenna base station according to claim 29 further comprising:
   a demodulator means for demodulating each of the plurality of uplink signals received by an array of antenna elements to produce a multiplicity of demodulated uplink signals having the plurality of uplink signals received by each element of the array of antenna elements; wherein
   said spatial signature estimator means is coupled to said demodulator means and estimates the plurality of spatial signatures in response to the multiplicity of demodulated uplink signals, the smart antenna base station further comprising;
   a modulator means coupled to the array of antenna elements and said downlink beamformer means for producing a multiplicity of modulated downlink signals having components associated with each element of the array of antenna elements by uniquely modulating each of the plurality of downlink signals for each element of the array of antenna elements to beamform the plurality of downlink beamforms.

35. The smart antenna base station according to claim 34 wherein each of the spatial signatures is either a vector or a matrix, further wherein the matrix is used in applications where a propagation channel is frequency selective with long delay multipath.

36. The smart antenna base station according to claim 34 wherein the number of the plurality of downlink beamforms exceeds the number of elements of the array of antenna elements thereby making the base station an adaptive antenna system rather than a sectored antenna system.

37. The smart antenna base station according to claim 34 wherein said demodulator means is further responsive to said spatial signature estimator means for constructively combining at least one uplink signal of the plurality of uplink signals received upon each element of the array of antenna elements to produce a constructively combined demodulated uplink signal in response to an uplink beamforming vector substantially identical to a spatial signature of the plurality of spatial signatures associated with the at least one uplink signal.

38. The smart antenna base station according to claim 34 wherein said demodulator means is further responsive to said spatial signature estimator means for constructively combining at least one uplink signal of the plurality of uplink signals received upon each element of the array of antenna elements to produce a constructively combined demodulated uplink signal in response to an uplink beamforming vector constructed from a spatial signature of the plurality of spatial signatures associated with the at least one uplink signal, the construction taking into account noise and interference characteristics as well as other spatial parameters to maximize signal-to-interference-and noise performance.

39. The smart antenna base station according to claim 34 wherein said demodulator means is further responsive to said spatial signature estimator means for constructively combining at least one uplink signal of the plurality of uplink signals received upon each element of the array of antenna elements to produce a constructively combined demodulated uplink signal in response to an uplink beamforming vector constructed from a spatial signature of the plurality of spatial signatures associated with the at least one uplink signal, the construction taking into account noise and interference characteristics as well as other spatial parameters to maximize bit-error-rate performance.

40. The smart antenna base station according to claim 34 further comprising:
   an antenna means having the array of antenna elements for wirelessly receiving the plurality of uplink signals modulated upon the common carrier frequency;
   a receiver means having an array of receivers, each receiver correspondingly coupled to one element of the array of antenna elements, said receiver means for separating the plurality of uplink signals from the common carrier frequency; wherein
   said demodulator means is coupled to said receiver means and is for demodulating each of the plurality of uplink signals from each receiver of the array of receivers to produce the multiplicity of demodulated uplink signals, and further comprising;
   a transmitter means having an array of transmitters, each transmitter correspondingly coupled to one element of the array of antenna elements, said transmitter means for wirelessly transmitting the plurality of downlink signals on the common carrier frequency; wherein
   said modulator means is coupled to the array of antenna elements through said transmitter means.

41. The smart antenna base station according to claim 40 further comprising:
   a combiner means for digitally combining components of the multiplicity of modulated downlink signals associated with each element of the array of antenna elements to produce an array of combined signals, wherein the multiplicity of modulated downlink signals are of a digital nature;
   a pulse shaper means coupled to said combiner means for digitally shaping each signal of the array of combined signals to produce a corresponding array of digitally shaped signals; and
   a digital to analog converter means coupled to said pulse shaper means and said transmitter means for converting the array of digitally shaped signals to a corresponding array of analog shaped signals; wherein
   said transmitter means modulates the array of analog shaped signals upon the common carrier frequency.

42. The smart antenna base station according to claim 41 wherein, said modulator means, said downlink beamformer means and said combiner means are comprised within a fast hadamard transform means.

43. The smart antenna base station according to claim 40 further comprising:
   a pulse shaper means coupled to said modulator means for digitally shaping the each component of the multiplicity of modulated downlink signals to produce a corresponding multiplicity of digital shaped signals;
   a digital to analog converter means coupled to said pulse shaper means for converting the multiplicity of digitally shaped signals to a corresponding multiplicity of analog shaped signals; and
   an analog combiner means coupled to said digital to analog converter means for combining the components of the multiplicity of analog shaped signals associated with each element of the array of antenna elements to produce an array of combined signals; wherein said transmitter means modulates the array of combined signals upon the common carrier frequency.

44. The smart antenna base station according to claim 29 wherein each of the plurality of uplink signals include a unique PN sequence from each of the plurality of remote terminals and further comprises:

a despreader means for despreading each PN sequence to obtain a multichannel symbol sequence comprising a plurality of symbol sequences wherein said spatial signature estimator means;

identifies a first symbol sequence from the multichannel symbol sequence having a maximum power;

normalizes the multichannel symbol sequence with respect to the first symbol sequence to produce a normalized multichannel symbol sequence; and calculates an average of the normalized multichannel symbol sequence to estimate a corresponding one of the plurality of spatial signatures.

45. The smart antenna base station according to claim 29 wherein each of the plurality of uplink signals include a unique PN sequence from each of the plurality of remote terminals and further comprises:

a despreader means for despreading each PN sequence to obtain a multichannel symbol sequence comprising a plurality of symbol sequences wherein said spatial signature estimator means;

forms a data covariance matrix of the multichannel symbol sequence; and calculates a principal eigen vector of the data covariance matrix to estimate a corresponding one of the plurality of spatial signatures.

46. A method in a smart antenna base station comprising the steps of:

simultaneously receiving a plurality of uplink signals on a common carrier frequency during an uplink time slot from a plurality of remote terminals wirelessly coupled to the base station;

estimating a plurality of spatial signatures associated with the plurality of uplink signals;

processing at least one of the plurality of spatial signatures for determining a corresponding direction of arrival vector associated with a remote terminal of the plurality of remote terminals;

beamforming a plurality of downlink beamforms correspondingly unique to each of the plurality of remote terminals, wherein said step of beamforming is not dependent upon the direction of arrival vector for beamforming a downlink beamform associated with the remote terminal; and simultaneously transmitting a plurality of downlink signals to the plurality of remote terminals on the common carrier frequency during a downlink time slot subsequent to the uplink time slot.

47. The method in the smart antenna base station according to claim 46 further comprising the steps of:

code division multiple access modulating each of the plurality of downlink signals on a corresponding plurality of code channels whereby each of the plurality of downlink signals has a unique downlink beamform and a unique code channel on the common carrier frequency; and determining a timing offset unique to each of the plurality of remote terminals for communication thereto, thereby enabling synchronization of each of the plurality of received uplink signals.

48. The method in the smart antenna base station according to claim 46 further comprising the step of:

demodulating each of the plurality of uplink signals received by an array of antenna elements to produce a multiplicity of demodulated uplink signals having the plurality of uplink signals received by each element of the array of antenna elements; wherein said step of estimating estimates the plurality of spatial signatures in response to the multiplicity of demodulated uplink signals, and wherein said step of beamforming further comprises the step of:

producing a multiplicity of modulated downlink signals having components associated with each element of the array of antenna elements by uniquely modulating each of the plurality of downlink signals for each element of the array of antenna elements to beamform the plurality of downlink beamforms.

49. The method according to claim 46 further comprising the steps of:

determining a multichannel symbol sequence associated with one of the plurality of remote terminals from the plurality of uplink signals; and determining an uplink power estimate as a principal eigenvalue of a data covariance matrix of the multichannel symbol sequence wherein;

said step of beamforming further comprises the step of establishing a power level for the downlink beamform corresponding to the terminal in response to the uplink power estimate.

50. The method according to claim 46 further comprising the steps of:

determining a multichannel symbol sequence associated with one of the plurality of remote terminals from the plurality of uplink signals; and determining an uplink power estimate as a quadratic mean of the multichannel symbol sequence wherein;

said step of beamforming further comprises the step of establishing a power level for the downlink beamform corresponding to the terminal in response to the uplink power estimate.

51. The TDD antenna array CDMA communications system as defined by claim 1, wherein the demodulator uses the uplink beamforming matrices in determining said estimates of the uplink messages from said terminals.

52. The TDD antenna array CDMA communications system as defined by claim 1, wherein the modulator is also coupled to said spatial processor.

53. The TDD antenna array CDMA communications system as defined by claim 52, wherein the modulator uses the downlink beamforming matrices for generating said multichannel downlink S-CDMA signals to transmit messages destined for said terminals.

54. A smart antenna base station comprising:

a spatial signature estimator for estimating a plurality of spatial signatures associated with a plurality of uplink signals received from a corresponding plurality of remote terminals wirelessly coupled to the base station, the plurality of uplink signals simultaneously received on a common carrier frequency during an uplink time slot;

a downlink beamformer coupled to said spatial signature estimator and responsive to the plurality of spatial signatures for beamforming a plurality of downlink beamforms correspondingly unique to each of the plurality of remote terminals and for simultaneously transmitting a plurality of downlink signals to the plurality of remote terminals on the common carrier frequency during a downlink time slot subsequent to the uplink time slot; and a code division multiple access modulator coupled to said downlink beamformer for code modulating each of the plurality of downlink signals on a corresponding plurality code channels whereby each of the plurality of downlink signals has a unique downlink beamform and a unique code channel on the common carrier frequency;

a demodulator for demodulating each of the plurality of uplink signals received by an array of antenna elements to produce a multiplicity of demodulated uplink signals having the plurality of uplink signals received by each element of the array of antenna elements;

wherein said spatial signature estimator is coupled to said demodulator and estimates the plurality of spatial signatures in response to the multiplicity of demodulated uplink signals.

55. The smart antenna base station according to claim 54 wherein said spatial signature estimator determines a timing offset unique to each of the plurality of remote terminals for communication thereto, thereby enabling synchronization of each of the plurality received uplink signals.

56. The smart antenna base station according to claim 54 further comprising a parameter estimator coupled to said spatial signature estimator for further processing at least one of the plurality of spatial signatures for determining a corresponding direction of arrival vector associated with a remote terminal of the plurality of remote terminals, wherein said downlink beamformer is not dependent upon the direction of arrival vector for beamforming a downlink beamform associated with the remote terminal.

57. The smart antenna base station according to claim 54 wherein at least one of the plurality of downlink beamforms is substantially identical to a corresponding at least one of the plurality of spatial signatures.

58. The smart antenna base station according to claim 54 wherein at least one of the plurality of downlink beamforms is optimized for maximum signal-to-interference-and noise performance by accounting for noise characteristics as well as other spatial parameters.

59. The smart antenna base station according to claim 54 wherein at least one of the plurality of downlink beamforms is optimized for maximum bit-error-rate performance by accounting for noise characteristics as well as other spatial parameters.

60. The smart antenna base station according to claim 54 wherein each of the spatial signatures is either a vector or a matrix, further wherein the matrix is used in applications where a propagation channel is frequency selective with long delay multipath.

61. The smart antenna base station according to claim 54 wherein the number of the plurality of downlink beamforms exceeds the number of elements of the array of antenna elements thereby making the base station an adaptive antenna system rather than a sectored antenna system.

62. The smart antenna base station according to claim 54 wherein said demodulator is further responsive to said spatial signature estimator for constructively combining at least one uplink signal of the plurality of uplink signals received upon each element of the array of antenna elements to produce a constructively combined demodulated uplink signal in response to an uplink beamforming vector substantially identical to a spatial signature of the plurality of spatial signatures associated with the at least one uplink signal.

63. The smart antenna base station according to claim 54 wherein said demodulator is further responsive to said spatial signature estimator for constructively combining at least one uplink signal of the plurality of uplink signals received upon each element of the array of antenna elements to produce a constructively combined demodulated uplink signal in response to an uplink beamforming vector constructed from a spatial signature of the plurality of spatial signatures associated with the at least one uplink signal, the construction taking into account noise and interference characteristics as well as other spatial parameters to maximize signal-to-interference-and noise performance.

64. The smart antenna base station according to claim 54 wherein said demodulator is further responsive to said spatial signature estimator for constructively combining at least one uplink signal of the plurality of uplink signals received upon each element of the array of antenna elements to produce a constructively combined demodulated uplink signal in response to an uplink beamforming vector constructed from a spatial signature of the plurality of spatial signatures associated with the at least one uplink signal, the construction taking into account noise and interference characteristics as well as other spatial parameters to maximize bit-error-rate performance.

65. The smart antenna base station according to claim 54 further comprising:

an antenna having the array of antenna elements for wirelessly receiving the plurality of uplink signals modulated upon the common carrier frequency;

a receiver having an array of receivers, each receiver correspondingly coupled to one element of the array of antenna elements, said receiver for separating the plurality of uplink signals from the common carrier frequency; wherein said demodulator is coupled to said receiver and is for demodulating each of the plurality of uplink signals from each receiver of the array of receivers to produce the multiplicity of demodulated uplink signals, and further comprising;

a transmitter having an array of transmitters, each transmitter correspondingly coupled to one element of the array of antenna elements, said transmitter for wirelessly transmitting the plurality of downlink signals on the common carrier frequency, wherein said modulator is coupled to the array of antenna elements through said transmitter.

66. The smart antenna base station according to claim 65 further comprising:

a combiner for digitally combining components of the multiplicity of modulated downlink signals associated with each element of the array of antenna elements to produce an array of combined signals, wherein the multiplicity of modulated downlink signals are of a digital nature;

a pulse shaper coupled to said combiner for digitally shaping each signal of the array of combined signals to produce a corresponding array of digitally shaped signals; and a digital to analog converter coupled to said pulse shaper and said transmitter for converting the array of digitally shaped signals to a corresponding array of analog shaped signals; wherein said transmitter modulates the array of analog shaped signals upon the common carrier frequency.

67. The smart antenna base station according to claim 66 wherein, said modulator, said downlink beamformer and said combiner are comprised within a fast hadamard transform unit.

68. The smart antenna base station according to claim 65 further comprising:
- a pulse shaper coupled to said modulator for digitally shaping the each component of the multiplicity of modulated downlink signals to produce a corresponding multiplicity of digital shaped signals;
- a digital to analog converter coupled to said pulse shaper for converting the multiplicity of digitally shaped signals to a corresponding multiplicity of analog shaped signals; and
- an analog combiner coupled to said digital to analog converter for combining the components of the multiplicity of analog shaped signals associated with each element of the array of antenna elements to produce an array of combined signals; wherein
- said transmitter modulates the array of combined signals upon the common carrier frequency.

69. The smart antenna base station according to claim 54 wherein each of the plurality of uplink signals include a unique PN sequence from each of the plurality of remote terminals, wherein the smart antenna base station further comprises:
- a despreader for despreading each PN sequence to obtain a multichannel symbol sequence comprising a plurality of symbol sequences wherein said spatial signature estimator:
  - identifies a first symbol sequence from the multichannel symbol sequence having a maximum power;
  - normalizes the multichannel symbol sequence with respect to the first symbol sequence to produce a normalized multichannel symbol sequence; and
  - calculates an average of the normalized multichannel symbol sequence to estimate a corresponding one of the plurality of spatial signatures.

70. The smart antenna base station according to claim 54, wherein each of the plurality of uplink signals include a unique PN sequence from each of the plurality of remote terminals, wherein the smart antenna base station further comprises:
- a despreader for despreading each PN sequence to obtain a multichannel symbol sequence comprising a plurality of symbol sequences wherein said spatial signature estimator:
  - forms a data covariance matrix of the multichannel symbol sequence; and
  - calculates a principal eigen vector of the data covariance matrix to estimate a corresponding one of the plurality of spatial signatures.

71. A method in a smart antenna base station, comprising the steps of:
- simultaneously receiving a plurality of uplink signals on a common carrier frequency during an uplink time slot from a plurality of remote terminals wirelessly coupled to the base station, wherein the plurality of uplink signals are received by an array of antenna elements;
- demodulating each of the plurality of uplink signals to produce a multiplicity of demodulated uplink signals having the plurality of uplink signals received by each element of the array of antenna elements;
- estimating a plurality of spatial signatures associated with the plurality of uplink signals, wherein said step of estimating estimates the plurality of spatial signatures in response to the multiplicity of demodulated uplink signals;
- beamforming a plurality of downlink beamforms correspondingly unique to each of the plurality of remote terminals, wherein said step of beamforming includes producing a plurality of modulated downlink signals having components associated with each element of the array of antenna elements by uniquely modulating each of the plurality of downlink signals for each element of the array of antenna elements to beamform the plurality of downlink beamforms; and
- simultaneously transmitting the plurality of modulated downlink signals to the plurality of remote terminals on the common carrier frequency during a downlink time slot subsequent to the uplink time slot.

72. The method in the smart antenna base station according to claim 71 further comprising the steps of:
- code division multiple access modulating each of the plurality of downlink signals on a corresponding plurality of code channels whereby each of the plurality of downlink signals has a unique downlink beamform and a unique code channel on the common carrier frequency; and
- determining a timing offset unique to each of the plurality of remote terminals for communication thereto, thereby enabling synchronization of each of the plurality of received uplink signals.

73. The method in the smart antenna base station according to claim 71 further comprising the step of
- processing at least one of the plurality of spatial signatures for determining a corresponding direction of arrival vector associated with a remote terminal of the plurality of remote terminals; wherein
- said step of beamforming is not dependent upon the direction of arrival vector for beamforming a downlink beamform associated with the remote terminal.

74. The method according to claim 71 further comprising the steps of:
- determining a multichannel symbol sequence associated with one of the plurality of remote terminals from the plurality of uplink signals; and
- determining an uplink power estimate as a principal eigenvalue of a data covariance matrix of the multichannel symbol sequence wherein;
- said step of beamforming further comprises the step of establishing a power level for the downlink beamform corresponding to the terminal in response to the uplink power estimate.

75. The method according to claim 71 further comprising the steps of:
- determining a multichannel symbol sequence associated with one of the plurality of remote terminals from the plurality of uplink signals; and
- determining an uplink power estimate as a quadratic mean of the multichannel symbol sequence wherein;
- said step of beamforming further comprises the step of establishing a power level for the downlink beamform corresponding to the terminal in response to the uplink power estimate.

* * * * *